US011531093B2

(12) United States Patent
Darrer et al.

(10) Patent No.: US 11,531,093 B2
(45) Date of Patent: Dec. 20, 2022

(54) LASER SCANNING CONTROL SYSTEM AND METHOD

(71) Applicant: Infineon Technologies AG, Neubiberg (DE)

(72) Inventors: Franz Michael Darrer, Graz (AT); David Brunner, Dobersberg (AT); Georg Schitter, Vienna (AT); Han Woong Yoo, Vienna (AT)

(73) Assignee: Infineon Technologies AG, Neubiberg (DE)

( * ) Notice: Subject to any disclaimer, the term of this patent is extended or adjusted under 35 U.S.C. 154(b) by 348 days.

(21) Appl. No.: 16/890,476

(22) Filed: Jun. 2, 2020

(65) Prior Publication Data

US 2020/0386867 A1   Dec. 10, 2020

(30) Foreign Application Priority Data

Jun. 7, 2019 (DE) .......................... 102019208386.2

(51) Int. Cl.
| | |
|---|---|
| *G01C 3/08* | (2006.01) |
| *G01S 7/481* | (2006.01) |
| *G01S 17/10* | (2020.01) |
| *G01S 7/484* | (2006.01) |

(52) U.S. Cl.
CPC ............ *G01S 7/4817* (2013.01); *G01S 7/484* (2013.01); *G01S 17/10* (2013.01)

(58) Field of Classification Search
CPC ......... G01S 7/4817; G01S 7/484; G01S 17/10
See application file for complete search history.

(56) References Cited

U.S. PATENT DOCUMENTS

| | | |
|---|---|---|
| 4,713,544 A | 12/1987 | Grage |
| 10,222,474 B1 | 3/2019 | Raring et al. |
| 2010/0301023 A1 | 12/2010 | Unrath et al. |
| 2021/0239834 A1* | 8/2021 | Kimura ............... G02B 26/101 |

FOREIGN PATENT DOCUMENTS

DE          3506088 A1    8/1986

* cited by examiner

*Primary Examiner* — Adam M Alharbi
(74) *Attorney, Agent, or Firm* — Harrity & Harrity, LLP

(57) ABSTRACT

There are disclosed techniques for laser scanning control. A system includes control equipment to perform a coordinated scanning control by controlling: a mirror driver, to drive a mirror along desired mirror positions through a motion mirror control signal; and a laser driver, to generate laser light pulses to be impinged onto the mirror at the desired mirror positions through a pulse trigger control signal. The control equipment includes a motion estimator to provide estimated motion information based on feedback motion measurement(s), to generate the pulse trigger control signal by adapting a desired scheduling, for triggering the laser light pulses, to the estimated motion information.

28 Claims, 15 Drawing Sheets

LASER SCANNING CONTROL SYSTEM AND METHOD

RELATED APPLICATION

This application claims priority to German Patent No. 102019208386.2, filed on Jun. 7, 2019, which is incorporated herein by reference in its entirety.

FIELD

The presented examples refer to laser scanning control systems and methods.

BACKGROUND

Laser scanning control systems and methods permit to direct laser light pulses towards specific directions. In particular, a mirror may be moved (e.g., oscillating), so that light pulses are reflected towards a plurality of directions.

The laser scanning control may lose accuracy, e.g., by virtue of vibrations, temperature, pressures, etc. As the directions are preselected, it is preferable to attain a laser scanning control system which guarantees the maximum possible precision of the direction of the reflection of the light, even in the presence of disturbances and external influences (e.g., due to vibrations).

SUMMARY

In accordance with an aspect, there is provided a laser scanning control system, including control equipment to perform a coordinated scanning control by controlling:

a mirror driver, to drive a mirror along desired mirror positions through a motion mirror control signal; and a laser driver, to cause the generation of laser light pulses to be impinged onto the mirror at the desired mirror positions through a pulse trigger control signal, wherein the control equipment includes a motion estimator to provide estimated motion information based on feedback motion measurement(s) associated to the motion of the mirror, to generate the pulse trigger control signal by adapting, to the estimated motion information, a desired scheduling for triggering the laser light pulses.

Accordingly, a more reliable timing of the motion of the mirror is achieved: the laser pulse generation is synchronized with the pulse trigger control signal, which in turn is synchronized with the estimated motion information, which in turn is synchronized with the feedback positional measurements, which in turn are synchronized with the motion of the mirror. Accordingly, the laser pulses will only be triggered when the mirror is actually at the preselected positions. Hence, the light will only be directed in the preselected directions.

For example, movements or positions of the mirror are measured or otherwise reconstructed, and used for adaptively correcting the shooting angle of the preselected angle.

According to an aspect, there is provided a positional estimator (which may be based, for example, on a Kalman filter) including:

a predictor, to predict motion information associated to the motion of the mirror; and a corrector, to correct the predicted motion information, to provide the corrected motion information as estimated motion information.

The predictor may be based, for example, on a model based on the dynamical interactions between the mechanical and electromechanical elements and their parameters (such as at least one of at least one of inertia, a linear damping factor damping the movement of the mirror, a linear and/or a non-linear cubic stiffness parameter associated to the motion of the mirror, etc.).

The predictor may predict the future state (e.g., motion information) which cannot be acquired by the control system. Subsequently, the corrector may correct the first estimate by compensating an error from the predicted state. In particular, the correction may be based on a comparison between a predicted output and a measured output.

Such a positional estimator may be used, for example, for controlling the generation of the pulses. In combination with or independently from the generation of the pulses, the positional estimator may be used for ameliorating the timing of a PLL loop for timing the movement (e.g., oscillation) of the mirror.

According to an aspect, there is provided a method including:

driving the motion of a mirror according to a synchronous movement;

estimating motion information from the feedback positional measurements; and performing at least one of the following operations:

generating a pulse trigger control signal by adapting a preselected scheduling to the estimated motion information;

timing the motion mirror control signal by considering the estimated motion information.

According to an aspect, there is provided a non-transitory storage unit including storing instructions which, when executed by a processor, cause the processor to perform one of the methods above.

DETAILED DESCRIPTION

Figure 1:
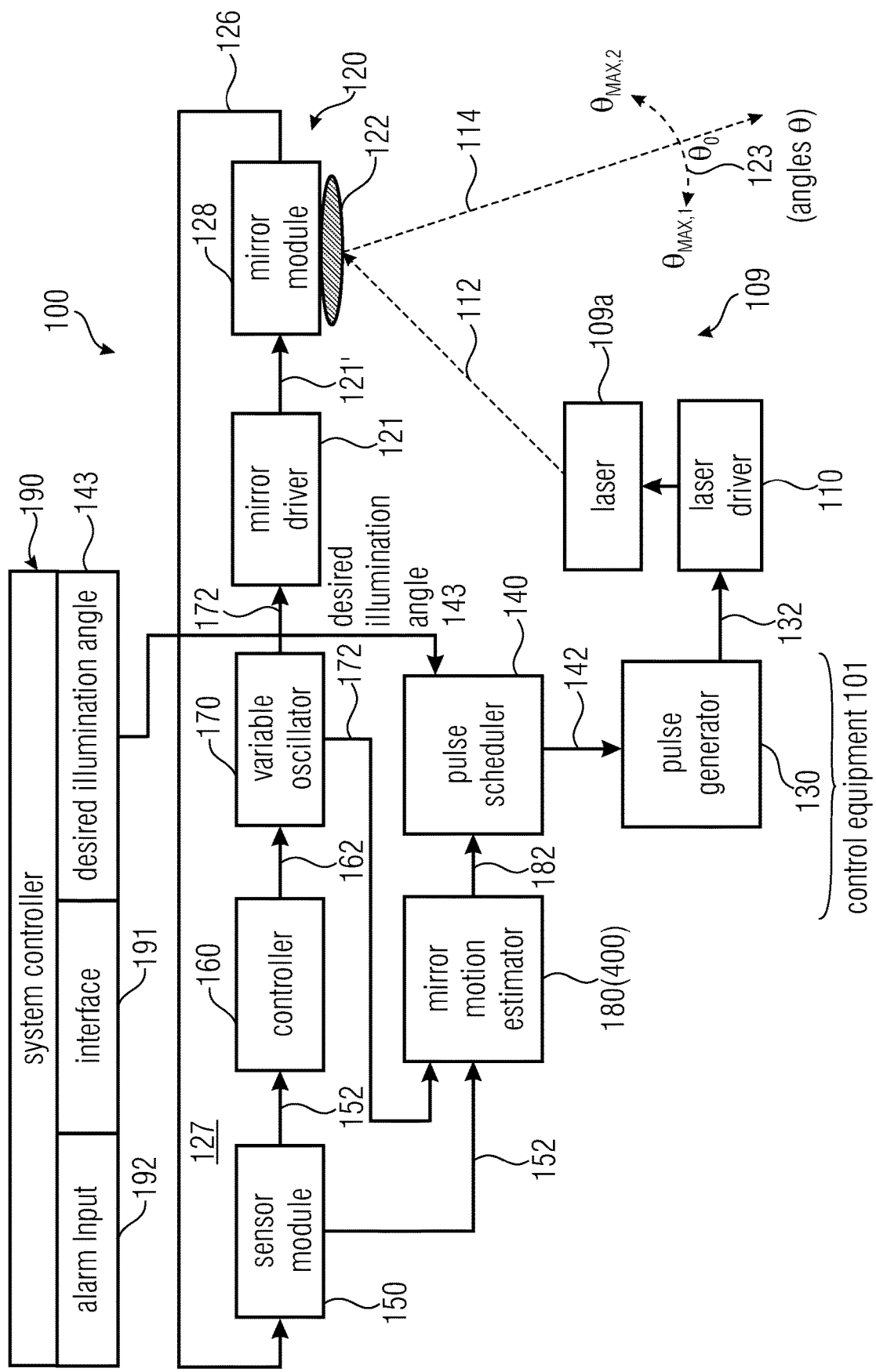
FIGS. 1-3 show laser scanning control systems according to examples.

FIG. 1 shows a laser scanning control system 100. The laser scanning control system 100 may comprise a high-level system controller 190 which may be used for controlling an application (e.g., for directing laser light according to preselected, desired angles defined by a preselected, desired scheduling 143). The high-level system controller 190 may include, for example, interface(s) 191, an alarm input 192, and/or a memory unit to store a desired scheduling 143.

The laser scanning control system 100 may be used, for example in a light detection and ranging (LIDAR) system for synchronizing light pulses (e.g., laser pulses) 112 with a moving mirror 122, e.g., so that the generated light pulses 112 impinge the mirror 122 at predetermined positions 123 (e.g., angles θ). The laser scanning control system 100 may include control equipment 101 (e.g., including circuitry). The control equipment 101 may perform a coordinated scanning control to control:

through a motion mirror control signal 172, a mirror driver 121, which may sequentially drive the mirror 122 along preselected mirror positions 123 (e.g., angles $\theta_1$, $\theta_2$, $\theta_3$ . . . ); and/or through a pulse trigger control signal 132, a laser driver 110, which may cause the generation light pulses 112 so that the light pulses 112 are impinged onto the mirror 122 at the preselected mirror positions 123.

The control equipment 101 may obtain (e.g., sequentially, in real time) feedback motion measurements 152 associated to the mirror 122, to adaptively synchronize the motion mirror control signal 172 with a reference signal (not shown) on the basis of feedback motion measurements 152 associated to the motion of the motion of the mirror 122.

The control equipment 101 may include a mirror motion estimator 180. The motion estimator 180 may provide estimated motion information 182 (e.g., information regarding at least one of position, velocity, acceleration, or information on other physical magnitudes associated to the position, torque or electrical magnitudes, such as capacitance, electric current, voltage, etc., so as to transduce mechanical magnitudes into electrical magnitudes; also distances obtained from optical detections may be used). The estimated motion information 182 may be based on the feedback motion measurements 152. The estimated motion information 182 may be used to control the laser driver 110, e.g., by generating the pulse trigger control signal 132 by adapting a desired scheduling 143 for triggering the laser light pulses 112 to the estimated motion information.

The mirror 122 may be part of a mirror system 120, and may be moved (e.g. according an oscillatory motion) driven by a mirror driver 121. The mirror driver 121 may be part of the mirror system 120. The mirror system 120 may be a microelectromechanical system (MEMS), e.g., operating as a mechanical moving mirror system (i.e., MEMS micromirror system) integrated on a semiconductor chip (not shown). The mirror driver 121 may be controlled by a motion mirror control signal 172 and induce (e.g., through electrostatic and/or electromagnetic forces) a movement of the mirror 122 which is aimed at being synchronized with a reference signal.

Figure 5:
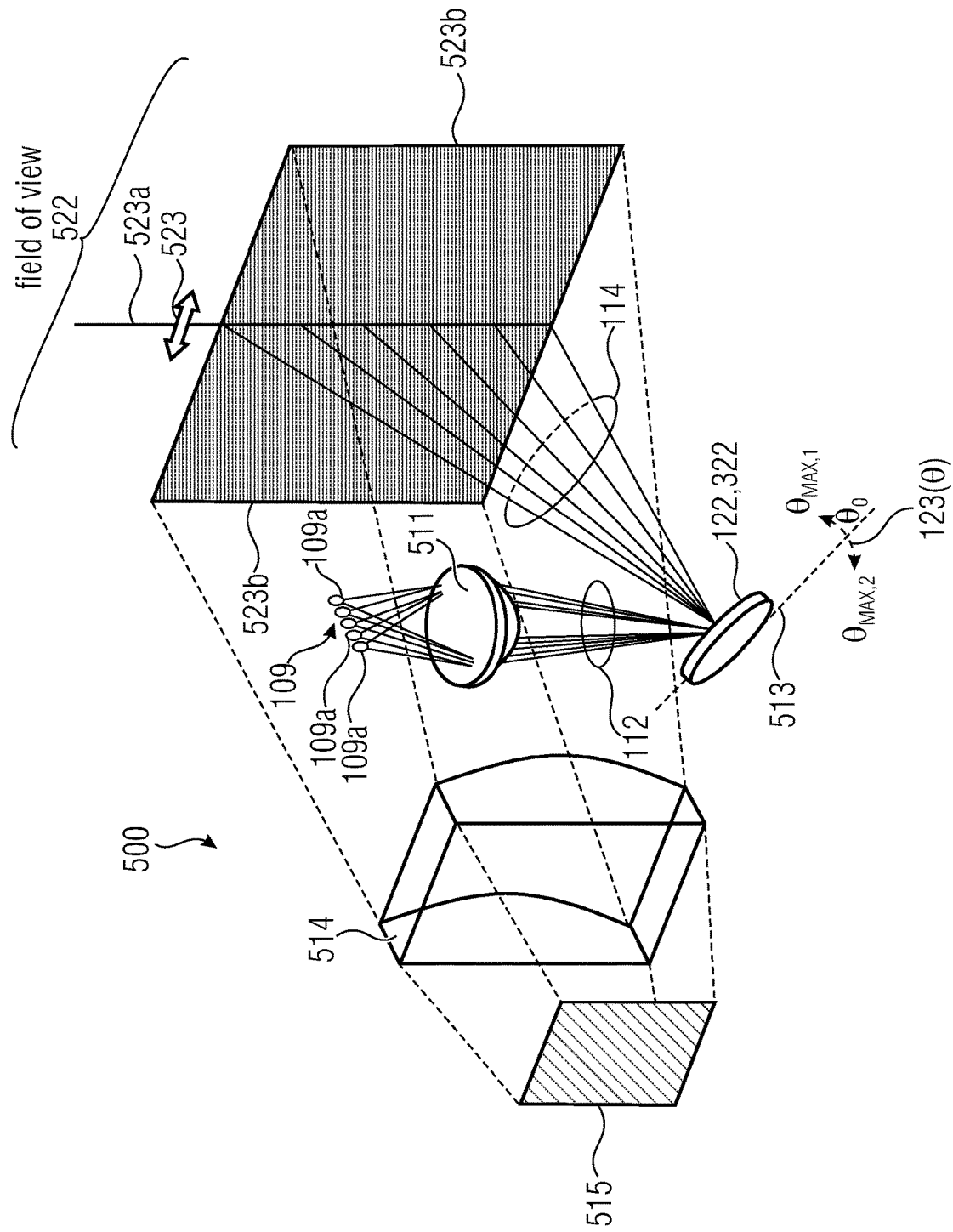
FIG. 5 shows elements of a laser scanning control system for a light detection and ranging (LIDAR) system including elements of the examples of FIGS. 1-3.

An example of the mirror 122 is provided in FIG. 5. The mirror 122 may be impinged by light pulses 112 to obtain reflected light pulses 114 directed according to directions defined by the position of the mirror 122. The mirror 122 may oscillate about a scanning axis (e.g., one single axis) 513. The mirror 122 may have one single degree of freedom for movement (e.g., only around axis 513, e.g., operating as an 1D MEMS mirror). Forced by the action of the mirror driver 122, the mirror 122 may oscillate, e.g., "side-to-side" about the scanning axis 513. This action may permit to reflect light 112 according to different directions 523 associated to the positions 123 (e.g., angles θ) taken by the mirror 122. The mirror 122 may oscillate (e.g., back-and-forth) in scanning directions. The mirror 122 may oscillate between a first maximum position (angle $\theta_{MAX,1}$) and a second maximum position (angle $\theta_{MAX,2}$), opposed to the first maximum position. The mirror 122 may alternate:

a rotational movement in a first rotation direction (e.g., from $\theta_{MAX,1}$ to $\theta_{MAX,2}$), which may represent, e.g., a clockwise rotation about the scanning axis 513; and a rotational movement in a second rotation direction (e.g., from $\theta_{MAX,2}$ to $\theta_{MAX,1}$), which may represent, e.g., a counter-clockwise rotation about the scanning axis 513 (or in any case a rotation in a direction opposite to the first rotation direction).

The positions swept by the mirror 122 (e.g., between angles $\theta_{MAX,1}$ and $\theta_{MAX,2}$) may define a field of view 522, associated to the volume illuminated by the light reflected by the mirror 122. The maximum positions (e.g., at angles $\theta_{MAX,1}$ and $\theta_{MAX,2}$) may be associated to edges 523b of the field of view 522. The field of view may be wide as the angle $\theta_{scope}=\theta_{MAX,2}-\theta_{MAX,1}$. The field of view 522 may be sequentially scanned along different scanning positions associated to desired mirror positions 123 (e.g., associated to angles θ between $\theta_{MAX,1}$ and $\theta_{MAX,2}$). For example, the mirror 122 may be configured to oscillate between $\theta_{MAX,1}=-15°$ and $\theta_{MAX,2}=+15°$, to steer light over 30° ($\theta_{scope}=30°$), making up the scanning range of the field of view 522. Other angles (e.g., wider or narrower than 30°) are possible, e.g., between $\theta_{MAX,1}=-20°$ and $\theta_{MAX,2}=+20°$ ($\theta_{scope}=40°$), for example.

Thus, the field of view 522 may be scanned, line-by-line, by a rotation of the mirror 122. One such sequence along the degree of motion (e.g., from $\theta_{MAX,1}$ to $\theta_{MAX,2}$ or vice versa from $\theta_{MAX,2}$ to $\theta_{MAX,1}$) may be referred to as a single scan or scanning cycle. Multiple scans may be used to generate distance and depth maps, as well as 3D images by a processing unit. The horizontal resolution of the depth maps and images may depend on the size of the incremental steps in rotation angle of the MEMS mirror 12 taken between scans.

The mirror driver 121 may drive the movements of the mirror 122. The mirror driver 121 may be understood as an actuator. The mirror driver 121 may be capable of performing rotational movements, e.g., between $\theta_{MAX,1}$ and $\theta_{MAX,2}$ and vice versa. The mirror driver 121 may be capable of forcing an oscillatory movement of the mirror 122. The movement of the mirror may be of the back-and-forth type. The mirror driver 121 may control a motor 128. The motor 128 may be an electrostatic motor. The motor 128 may be a capacitive motor. The motor 128 may be a MEMS motor. The mirror driver 121 may include an inverter, which may cause the movement of the motor 128, e.g., by applying a particular voltage to the motor 128. The mirror driver 121 may cause the mirror 121 to oscillate around the axis 513 (e.g., associated to a zero position $\theta_0$). The mirror driver 121 may be controlled by an input 172 (motion mirror control signal), which may be in the form of a logic control (e.g., a binary value).

The mirror driver 121 may control a motor (or anyway a structure) 123 including interdigitated finger electrodes. E.g., the motor 123 may include an interdigitated structure, in which frame combs (which are integral with a fixed, non-rotating part) are interdigitated with mirror combs (with are integral with a rotating part, e.g. the mirror 122). A driving voltage 121' (e.g., 100 V, or in other examples a voltage which may be greater than 60 V) may be applied to the motor 123 by the mirror driver 121. The driving voltage 121' applied to the finger structure may generate a corresponding attraction between the electrodes of the motor 128. The driving voltage 121' across the finger structure may create a driving force (e.g., attraction between positive charges and negative charges) between interdigitated mirror combs and the frame combs, which may create a torque on the mirror 122 about the rotation axis 513. The driving voltage 121' may be of the type switched or toggled on-and-off. The driving voltage 121' may cause an oscillating driving force. The oscillating driving force may cause the mirror 122 to oscillate back and forth on its rotation axis between two extrema (e.g., $\theta_{MAX,1}$ and $\theta_{MAX,2}$). As the mirror 122 oscillates, the capacitance between the finger electrodes changes according to the mirror's position, e.g., by virtue of the different distance between the interdigitated electrodes. In examples, the mirror driver 121 is so that the electric current is maximum at the maximum angles (e.g., $\theta_{MAX,1}$ and $\theta_{MAX,2}$), and is zero at a zero angle $\theta_0$.

The mirror driver 121 may generate a non-continuous voltage 121' (e.g., square waves, rectangular waves, etc.), which may be an alternate voltage. In some cases, the non-continuous voltage 121' is meant at being at one of two levels, e.g., "high-voltage" and "low-voltage", with a rapid front between the two levels (e.g., rinsing edge, falling edge). The voltage 121' may be used for inducing the force at the interdigitated electrodes. The voltage 121' shall in general provide a timing for the motion mirror control signal 172.

Motion measurements 152 (which may be feedback motion measurements) may be obtained, e.g., to operate as feedback for the control equipment 101. The motion measurements 152 may be obtained sequentially. The motion measurements 152 may be discrete measurements, e.g., associated to discrete sampling times i−1, i, i+1, etc. E.g., at the discrete sampling times i−1, i+1, etc., different measurements m[1], m[2], m[2] may be obtained, each being associated to the positions of the mirror 122 at subsequent positions θ[1], θ[2], θ[2]. A feedback indicating the position of the mirror 122 may be obtained in real time, to perform a real-time control (e.g., feedback-like control).

The motion measurements 152 may be understood as (or may be used for generating) a signal (also represented with 152), e.g., a sampled signal defined in discrete sampling times i−1, i, i+1, etc. In some examples, the motion measurements 152 have a phase, a frequency, a period, etc, which may evolve with time.

The motion measurements 152 may include information on position and/or velocity and/or acceleration or other magnitudes associated to the position and/or motion and/or acceleration of the mirror 122. Motion measurement(s) 152 may include or may be based on:

measurement(s) on the position of the mirror 122 (e.g., providing information on the angle θ at each of the sampling times i−1, i, i+1); and/or measurement(s) on the variation of the position of the mirror (e.g., information on the velocity $\dot{\theta}$ at each of the sampling times i−1, i, i+1); and/or measurement(s) on the trend of the variation of the position of the mirror (e.g., accelerometric information providing information on angular acceleration $\ddot{\theta}$ at each of the sampling times i−1, i, i+1).

In addition or alternative, the motion measurements 152 may include or may be based on:

direct measurement(s) (e.g., direct measurement(s) of position, velocity, acceleration, e.g., as derived by encoders and/or gyro tachos, etc.); and/or indirect measurement(s), such as measurements associated to torque, electric current, capacitance, optical measurements, etc., which are associated to magnitudes of position, the velocity or the acceleration, so as to provide, at least indirectly, information regarding the motion of the mirror 122.

The motion measurement(s) 152 may include zero-crossing measurement(s), such as indications of time instants in which a particular magnitude (e.g., a magnitude associated to the particular position) traverses a "zero-crossing position", e.g., a position indicative of the passage of the mirror 122 through a zero position $\theta_0$, (or another position intermediate to $\theta_{MAX,1}$ and $\theta_{MAX,2}$; $\theta_0$ may be such that $\theta_0 = (\theta_{MAX,2}-\theta_{MAX,1})/2$, for example).

In some examples, it is not strictly necessary that a particular magnitude physically reaches a null, 0, value, but a reference value which may also be different from 0; the reference value may be compared with a threshold value to determine the "zero value".

In some examples, different crossing instants are measured for sampling time. For example, a first, zero-crossing event may be measured (e.g., when the position reaches $\theta_0$), while a second amplitude (e.g., $\theta_{AmpT}=6°$ or, more in general, a particular value between 4° and 10°) may also be measured in the same sampling time. Therefore, more reliable motion measurements may be obtained.

The motion measurement(s) 152 may include information (which may be time-stamped) on the instant in which the angle θ has traversed some particular positions (e.g., zero position $\theta_0$ or another position, such as $\theta_{AmpT}$). Therefore, one measurement 152 may comprise the information of the instant $t_{mirzc}[i]$ and/or $t_{AmpT}[i]$ at which a particular magnitude (e.g., the electric current) has traversed the value 0. From the time indication, it is possible to obtain information (e.g., phase information, amplitude information, frequency information, etc.) associated to the motion of the mirror 122 in the oscillation (e.g., position, velocity, acceleration, etc.). The inverse of the sampling rate (sampling period) may be understood as being subdivided into a plurality of discrete time instants, and a measurement may be the indication of one of the discrete time instants (if any) for each sampling period.

The motion measurement(s) 152 may include peak detection measurements (e.g., the time instant at which a peak has been detected in a signal).

The motion measurement(s) 152 may include trajectory analysis on measurement(s) such as those above.

The motion measurement(s) 152 may be filtered, e.g., through a lowpass filter.

It is noted that, in examples, position may be associated to a particular angle; velocity may be associated to angular velocity; and acceleration may be associated to angular acceleration.

An example of measurement(s) is here discussed, e.g., based on measurement(s) on capacitance(s). This is in particular feasible with the interdigitated structure of the mirror systems 120 as discussed above. It is possible to measure the capacitance between the interdigitated finger electrodes, and determine a rotation position or angle position of the mirror 122 therefrom. By monitoring the capacitance, zero-crossing events (or other events associated to the passage at specific angles), and a timing thereof may be obtained, hence obtaining feedback motion measurements 152 for the control equipment 101. The sensing of the position of the mirror 122 may be performed by a mirror detector (sensor module 150) that may be configured to measure the capacitance or a quantity associated to the capacitance. For example, as the mirror 122 moves, the geometry of the interdigitated-finger structure changes, resulting in a change of the geometry (e.g. change in the distance between the electrodes of the capacitor or change in the angle between the electrodes of the capacitor). As the geometry of the interdigitated-finger structure changes, the capacitance itself changes. A specific capacitance $C(\theta)$ corresponds with a specific position 123 of the mirror 122, by virtue of the modified geometry (distance between the electrodes, rotation angle θ, etc.). By sensing the capacitance C(θ) of the finger structure, a specific position of the mirror 122 can therefore be determined. One way to measure the capacitance C(θ) is to measure an electric current flowing through the finger structure, convert the measured electric current into a voltage, and then correlate the voltage to a capacitance C(θ) and/or angle θ. Other techniques, however, may be used, which may make use, for example, of sensors of mechanical magnitudes, such as positions (e.g., angle sensors), velocities (e.g., velocity sensors), accelerations (e.g., accelerometric sensors, gyro sensors, etc.), torque, etc.

Since the mirror 122 is driven at a set oscillation frequency (e.g., based on the frequency of the motion mirror control signal 172), when the mirror 122 rotates in a first rotation direction (e.g., from $\theta_{MAX,1}$ to $\theta_{MAX,2}$), the mirror 122 crosses a zero position $\theta_0$ at a certain point of time $t_{mir,zc}$. The same occurs when the mirror 122 rotates in the second rotation direction (e.g., from $\theta_{MAX,2}$ to $\theta_{MAX,1}$), the mirror 122 will cross the zero position $\theta_0$ at a certain point in time $t_{mir,zc}$. These instances of crossing the zero position $\theta_0$ may be referred to as zero-crossing events which occur at zero-crossing time instants $t_{mir,zc}$. The same applies when the mirror 122 crosses a particular position (e.g., $\theta_{AmpT}$) associated to an angle different from 0°.

As shown in FIG. 1, the feedback motion measurement(s) 152 may be obtained by a sensor module (e.g., detector) 150 on the basis of a physical magnitude 126. In some examples, the sensor module 150 is part of the mirror driver 121 (FIG. 1 shows the sensor module 150 as being part of the control equipment 101, even though the sensor module 150 may be integrated into the mirror system 120), and the physical magnitude 126 may be a mechanical magnitude (position, velocity, acceleration, torque, vibration etc.) or an electric magnitude (e.g., electric current, voltage, frequency, phase, etc.). In general terms, when there is not a sensor which directly senses a mechanical magnitude (angle, position, acceleration, torque, vibration, etc.) but only an electric magnitude (e.g., the electric current and/or capacitance at the mirror driver 121 and/or at the motor 128) from which a mechanical magnitude may be estimated, the laser scanning control system 100 is considered sensorless (even though the sensor is actually an electric sensor).

In general, the oscillations of the mirror 122 are not as in the ideal case: the frequency and the phase are not completely constant in time. The oscillatory motion of the mirror 122 is in general affected by a variable phase noise and a variable frequency noise with respect to the ideal oscillations (e.g., during time, phase and frequency may tend to drift). The motion measurements 152 may therefore provide information associated to phase and/or amplitude and/or frequency of the oscillations of the mirror 122. Accordingly, the control equipment 101 may operate so as to reduce phase noise and the frequency noise with respect to the ideal oscillations.

Phase-locked loop, PLL, equipment may be used for controlling the movements of the mirror 122. For example, the PLL equipment may include a controller 160 and a variable oscillator 170. The controller 160 may, for example, obtain the feedback motion measurement(s) 152 and filter it. The controller 160 may, for example, control a variable oscillator 170, by providing information 162 obtained from the feedback motion measurement(s) 152. For example, the controller 160 may provide information based on the zero-crossing events and/or on other events (e.g., when particular mirror's positions are reached). In examples, the information 162 may include a processed version of the feedback motion measurement(s) 152. In examples, the information 162 may include information regarding specific events (e.g., zero-crossing events and/or other events, such as the position crossing $\theta_{AmpT}$).

The PLL equipment may comprise a variable oscillator 170. The variable oscillator 170 may generate the motion mirror control signal 172 which controls the movements of the mirror 122. The variable oscillator 170 may include a timer: for example, the variable oscillator 170 measure count the time elapsed from a first event (e.g., zero-crossing event or another event) to a second event (e.g. zero-crossing event or another event). Counting may be based on a reference signal, e.g., obtained from an external clock. For example, the variable oscillator 170 may keep track of how many instants have been elapsed from a last event. By counting the time instants from a particular event, the variable oscillator 170 may be used to synchronize the motion mirror control signal 172 (and the voltage 121' applied to the motor 128) to the position of the mirror 122 by means of the feedback 126 (measured as 152). For example, the variable oscillator 170 may apply a voltage different from zero when it is estimated that a maximum angle ($\theta_{MAX,1}$, $\theta_{MAX,2}$) is achieved: this estimation may be obtained by measuring the time elapsed from the last zero-crossing event. The variable oscillator 170 may obtain phrase information.

The motion mirror control signal 172 may be understood as a motion mirror control signal which controls the status that the mirror driver 121 shall have. In examples, the oscillator 170 may be a voltage-controlled oscillator (VCO). Other examples are notwithstanding possible. The oscillator 170 may control the length of the period of one single oscillation, e.g., by commanding the mirror driver 121 to apply a specific voltage value to the motor 128 for a specific time length. The oscillator output 172 may be binary (e.g., 0 vs 1, or more in general "high-voltage period" vs "low-voltage period"), but the mirror driver 121 may be configured to follow the binary value (e.g., by imposing a high-voltage, e.g. of 100 V, and a low-voltage, e.g., 0 V, to the motor 128). The oscillator output 172 may be a signal whose phase and/or frequency are adjusted, e.g., to provide a rising edge of the voltage 121' in correspondence with the maximum angle ($\theta_{MAX,1}$, $\theta_{MAX,2}$) of the mirror 122.

A PLL control loop 127 for controlling the motion of the mirror 122 may therefore be obtained by element such as at least some of the elements 121, 128, 150, 160, 170 and/or by signals such as at least some of the signals or magnitudes 126, 152, 162, 172, 121'.

The mirror 122 may be impinged by light pulses 112 to direct reflected light pulses 114 according to directions (in the field of view 522) defined by the position 123 of the mirror 122 at the instant in which the light pulses 112 reach the mirror 122. The light pulses 112 may be laser light pulses.

A laser driver 110 may be part of an illumination unit 109 for generating the light pulses 112. The illumination unit 109 (a structural layout of which is schematized in FIG. 5) may include at least one light source 109a (e.g., a plurality of light sources 109b. The at least one light source 109a may include laser diode(s) or light emitting diode(s). A plurality of light sources 109a may be configured as an array (or matrix) of linearly aligned light sources 109a. The light pulses 112 emitted by the light source(s) 109a may be infrared light, although light with other wavelength might also be used in some examples. As can be seen from FIG. 5, the shape of the light emitted by the light sources 109a may be spread in a direction perpendicular to a transmission direction to form a light beam with an oblong shape perpendicular to a transmission. The illumination light transmitted from the light source(s) 109a may be directed towards the mirror 122.

Between the light source(s) 109a and the mirror 122, a transmitter optics 511 may be interposed. The transmitter optics 511 may be configured to focus each the laser light 112 onto the mirror 122. The transmitter optics 511 may be, for example, a lens or a prism. When reflected by the mirror 12, the rays of the light emitted from the light sources 109a may be aligned vertically to form a one-dimensional vertical scanning line of infrared light or a vertical bar of infrared light. Each light source(s) 109a (e.g., photodiode) of the illumination unit 109 may contribute to a different vertical region of a vertical scanning line 523a. While five laser sources 109a are shown in FIG. 5, it will be appreciated that the number of laser sources 109a are not limited thereto. For example, the vertical scanning line 523a may be generated by a single laser source 109a, two laser sources 109a, and so on. It will also be appreciated that the light sources 109a may be arranged in a matrix formation.

The laser driver 110 may be controlled by a pulse generator 130: the pulse generator 130 may trigger pulse commands 132 via a pulse trigger control signal 142, following which the laser driver 110 may generate the light pulses 112.

The pulse generator 130 may be input with a scheduling 142 provided in real time by a pulse scheduler 140. The pulse scheduler 140 may be input with a desired scheduling or preselected scheduling 143. The desired scheduling 143 may be defined, for example, from an application layer or a higher-layer control.

Ideally, the light pulses 112 are meant at following the desired scheduling 143. The desired scheduling 143 may define, for example, desired (preselected) mirror positions or illumination angles ($\theta_1$, $\theta_2$, $\theta_3$ etc.) at which the mirror 122 is to be impinged (e.g., associated to the scanning directions in the field of view 522). Theoretically, this effect can be attained by following the motion mirror control signal 172 as provided by the oscillator 170: since the loop 127 permits to control the phase and the frequency of the mirror oscillations on the basis of the motion mirror control signal 172, it could be imagined that the motion mirror control signal 172 could be used for timing the light pulses 112.

Figure 9A:
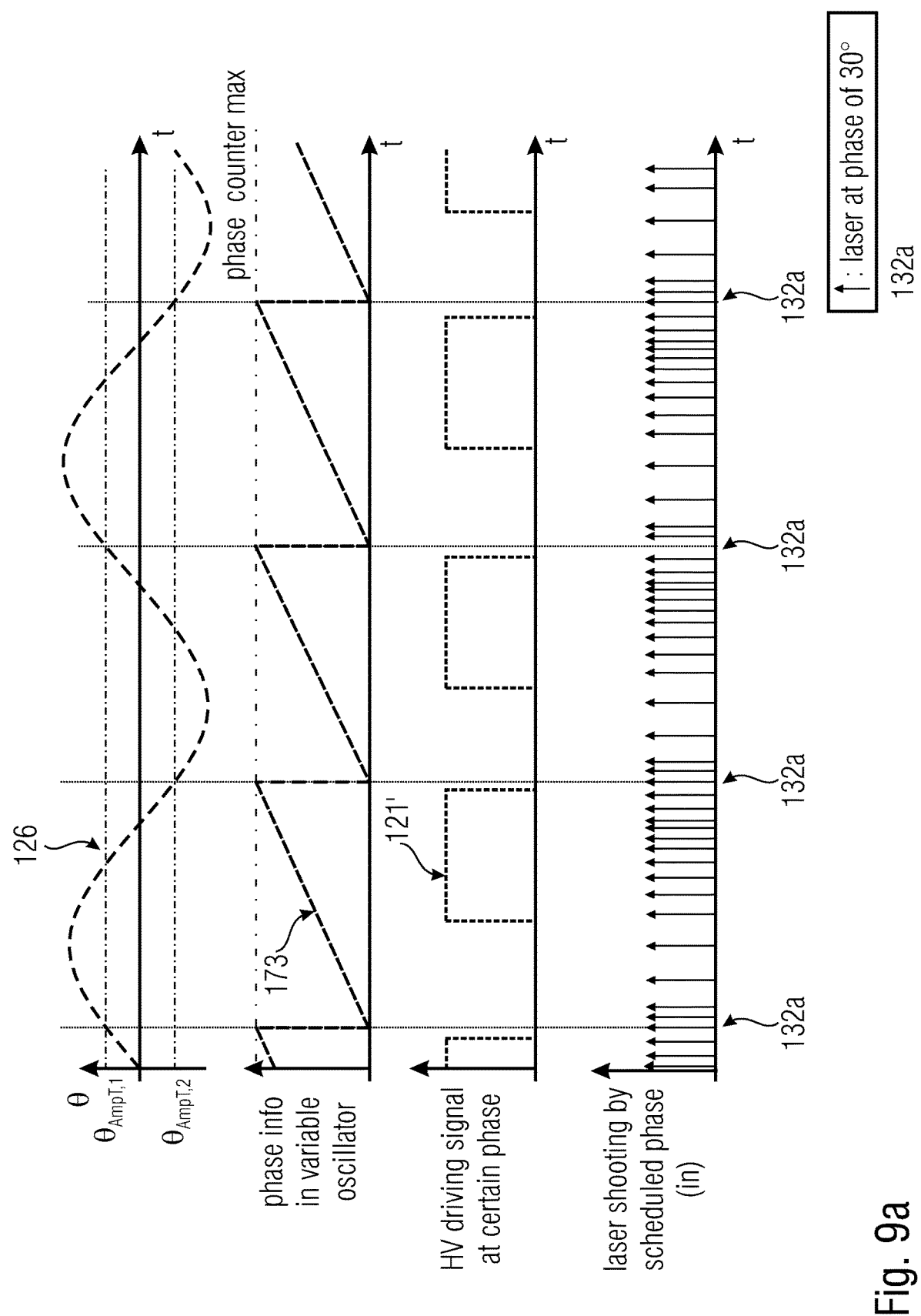
FIGS. 9a to 9c show temporal evolutions of signals in examples.

The ideal case is shown in FIG. 9, showing the position 126 (angle θ), which is measured by the sensor module 150 as measurement 152. Information associated to the position 126 may be acquired as the measurement 152 on the time instant in which the mirror's position has reached the angle $\theta_{AmpT,1}$ or $\theta_{AmpT,2}$ (which in this case may be the halves of the maximum amplitudes respectively in two directions). FIG. 9a also shows the time 173 elapsed from the last event (e.g., time elapsed from when mirror's position has reached the angle $\theta_{AmpT,1}$ or $\theta_{AmpT,2}$), as internally measured by the oscillator 170. FIG. 9a also shows the voltage 121' applied by the motor driver 121 to the motor 128. FIG. 9a also shows the ideal laser shooting according to the desired scheduling 143. For example, a particular laser pulse may be generated in correspondence with a specific angle $\theta_{AmpT,1}$ or $\theta_{AmpT,2}$ (e.g., 30°). As can be seen from FIG. 9a, the timer which counts the elapsed time 173 may be basically provide the phase at which a particular laser pulse has to be shot. Ideally, the timer is reinitialized each time $\theta_{AmpT,1}$ or $\theta_{AmpT,2}$ is reached, and a pulse 132a is fired.

However, it has been noted that, even trying to follow the desired scheduling 143, imperfect timing could be caused, and the mirror 122 could be impinged by light pulses 112 at unintended angles (different from the scheduled angles 143). This is because, in practical situations, external influence, e.g., vibrations, such as vibrations due to the external environment, may change the dynamics of the oscillations.

Figure 9B:
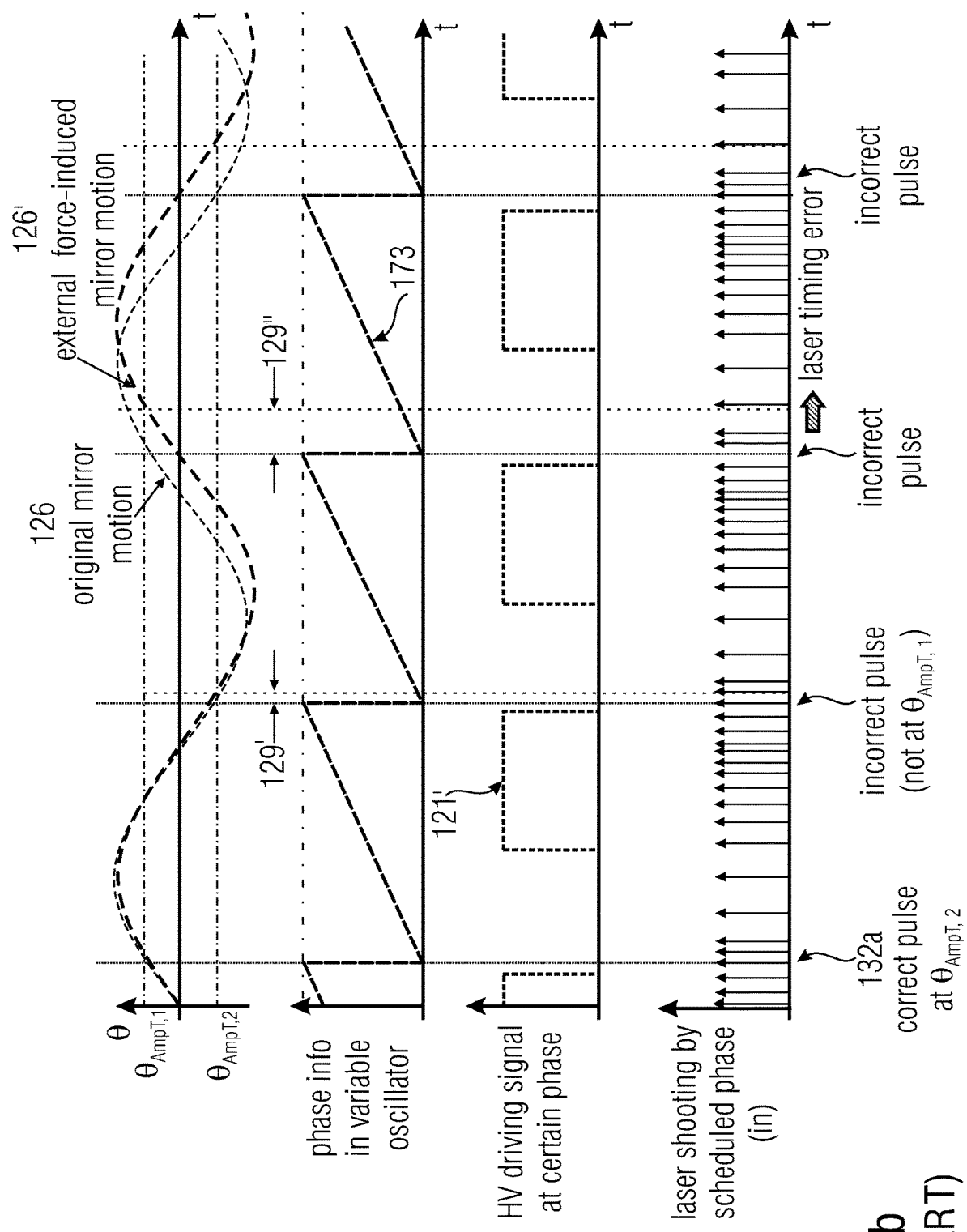

An example of non-ideal operation (e.g., in the prior art) is shown in FIG. 9b, which shows that the mirror oscillation drifts from the intended oscillation 126 to the real oscillation 126'. In the prior art, the pulse scheduling was based on information 172 from the oscillator 170: however, the pulse scheduling did not result in phase with the oscillation 126 (see the phase 129' which evolves into a larger phase 129").

It has been understood that is possible to perform a control of the time instants in which the light pulses 112 are generated, such that the light pulses 112 reach the mirror 122 at desired mirror positions (e.g., desired angles), e.g., to control the directions of the generated light pulses 112 synchronously with the motion of the mirror 122. Such a control is in general rendered difficult by virtue of disturbances or other influences, such as vibrations.

However, it has been understood that it is possible to adequately control the generation of the laser pulses 112 on the basis of estimated motion information 182 based on the feedback motion measurements 152. By relying on a motion estimator 180, a pulse trigger control signal 132 may be generated which is adaptively synchronized with the oscillations of the mirror 122. A better control may therefore be achieved, e.g., based on comparing the motion mirror control signal 172 with the feedback motion measurements 152. For example, positions (e.g., angles) of the mirror 122 may be estimated, even if they, by virtue of the vibrations, are not directly observed. The position of the mirror 122 may be estimated (e.g., at 182) not only based on the motion mirror control signal 172 only or on the feedback motion measurements 152, but by comparing all this information so as to estimate, with higher precision, the position of the mirror 122. In some examples, the estimated motion information 182 may be understood as reconstructed information on the motion (e.g., oscillation) of the mirror 122.

The pulse scheduler 140 may schedule (at 142), in real time, the light pulses 122 by adapting the desired scheduling 143 to the estimated motion information 182, so that the pulse generator 130 generates a pulse trigger control signal 132 according to a timing which keeps into account the (instantaneous) estimated position of the mirror 122. The phase and the frequency of the pulse trigger control signal 132 are therefore adapted to the oscillations of the mirror 122, and the light pulses 112 are generated at time instants which respond to the intended angles of the mirror 122 as set by the desired scheduling 143. The presence of vibrations may be tolerated and their negative effect may at least be reduced.

The estimated motion information 182 may be understood as (or may be used for generating) a signal (also represented with 182), e.g., a sampled signal defined in discrete sampling times i−1, i, i+1, etc. In some examples, the estimated motion information 182 have a phase, a frequency, a period, etc, which may evolve with time.

Figure 10A:
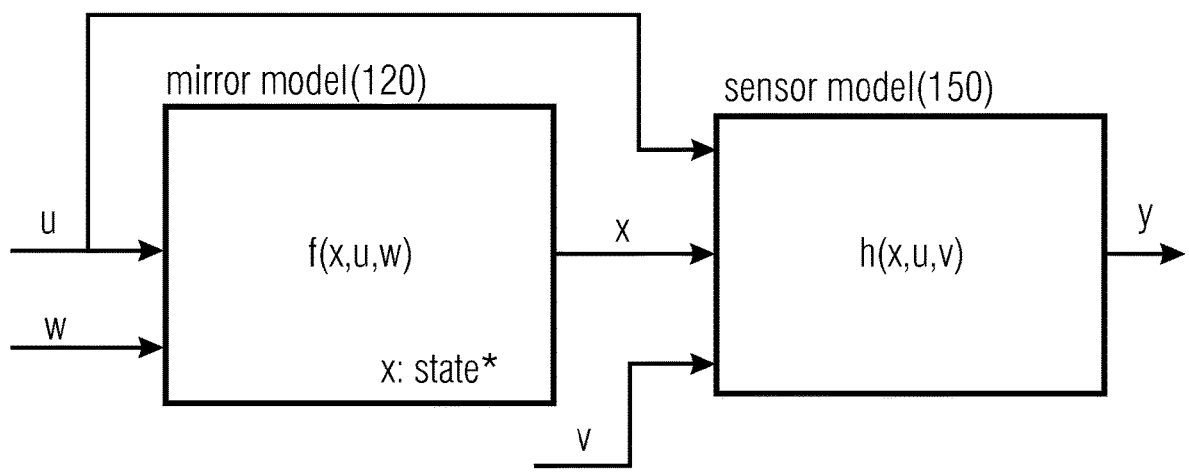
FIGS. 10a to 10c show models for laser scanning control systems according to examples.
Figure 10B:
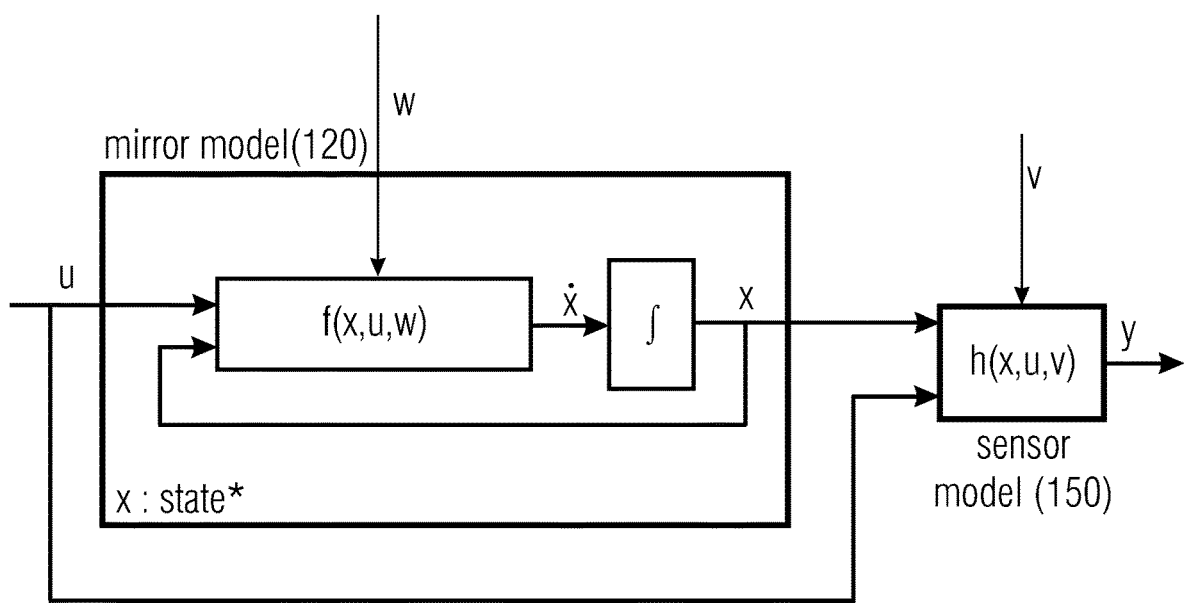
Figure 10C:
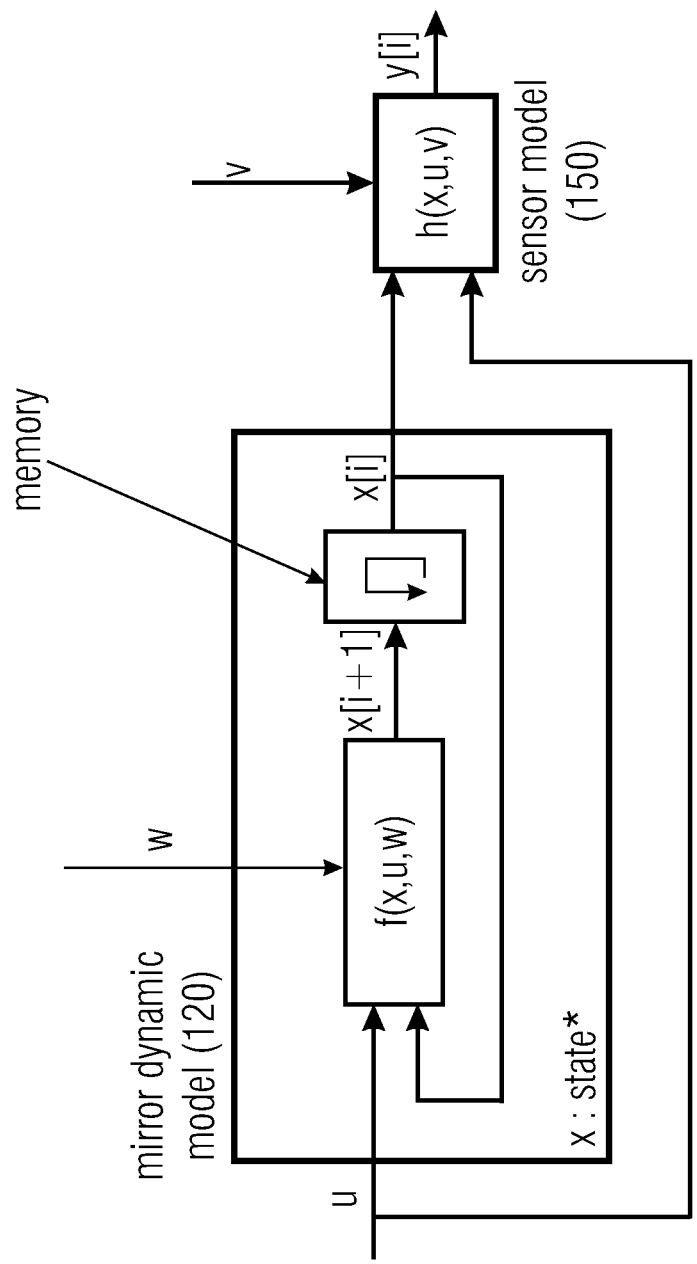

In order to explain the functioning of the motion estimator 180, a model on the dynamics of the motion of the mirror 122 is briefly summarized with particular reference to FIGS. 10a to 10c.

The action of the motor driver 121 onto the motor 128 and the mirror 122 may generate oscillations of the mirror 122. According to one model, the oscillations follow the model of parametric Duffing oscillator. According to one model, the dynamic of the mirror may be described by an equation like:

$$J\ddot{\theta} + \gamma\dot{\theta} + k_1\theta + k_3\theta^3 = \frac{1}{2}\frac{dC}{d\theta}u^2$$

where J denotes the inertia of the mirror 122, y a linear damping factor, $k_1$ and $k_3$ denote linear and non-linear cubic stiffness parameters, C denotes the variable capacitance (e.g., between the interdigitated fingers), θ denotes the angle of the mirror 122 around the axis 513, $\dot{\theta}$ denotes the angular velocity, $\ddot{\theta}$ denotes the angular acceleration, and u denotes the input from the mirror driver 121 (e.g., voltage following the motion mirror control signal 172). However, other models may be used, e.g., on the basis of the specific configuration.

In general terms, we may understand the oscillation as described by the following system of equations (mapped by FIGS. 10*a* and 10*b*):

$$\dot{x} = f(x,u,w)$$

$$y = h(x,u,v)$$

In general, f models the behaviour of the mirror system 120, and h models the behaviour of the sensor module 150. x denotes a vector describing the state of the mirror 122, and may include mirror frequency, phase, amplitude, etc. In general, it is not always possible to exactly know, at each instant, the state of the mirror 122. The variation $\dot{x}$ of the state (e.g., the variation in phase, amplitude, frequency . . . ) may be a function of an input u (which may comprise aspects associated to the voltage 121' such as the frequency, the duty cycle, the maximum voltage etc.) and of disturbance w, which may include vibrations, is not a priori known, and is not modelled. y describes an output, and may be based on the feedback motion measurements 152 (zero crossing, phase difference, current signal, etc.) associated to the oscillation of the mirror 122. As for the second equation above, output y is function of the state x, the input u, and measurement noise v.

The dynamics of the oscillation of the mirror 122 and of the detection of the feedback measurements 152 is in general described by the functions f and h, which follow the particular configuration.

The above-discussed equation may become:

$$J\ddot{\theta} + \gamma\dot{\theta} + k_1\theta + k_3\theta^3 = \frac{1}{2}\frac{dC}{d\theta}u^2$$

$$\frac{d}{dt}\begin{bmatrix}\theta\\\dot{\theta}\end{bmatrix} = \begin{bmatrix}0, & 1\\-\frac{k_1+k_3\theta^2}{J} & -\frac{\gamma}{J}\end{bmatrix}\begin{bmatrix}\theta\\\dot{\theta}\end{bmatrix} + \begin{bmatrix}0\\\frac{1}{2J}\frac{dC(\theta)}{d\theta}\end{bmatrix}u^2 + Gw$$

where:
the vector $$\begin{bmatrix}\theta\\\dot{\theta}\end{bmatrix}$$

represents the state x (first component of the vector: position θ; second component of the vector: angular velocity $\dot{x}$);

$$\frac{d}{dt}\begin{bmatrix}\theta\\\dot{\theta}\end{bmatrix}$$

represents $\dot{x}$, and therefore provides information on the evolution of the state;

$$\begin{bmatrix}0, & 1\\-\frac{k_1+k_3\theta^2}{J} & -\frac{\gamma}{J}\end{bmatrix}$$

relates to f(x) at u=0 and w=0;

$$\begin{bmatrix}0\\\frac{1}{2J}\frac{dC(\theta)}{d\theta}\end{bmatrix}$$

relates to f(u) at x=0 and w=0;
G relates to f(w) at x=0 and u=0 (this is associated to the disturbance due to vibrations)

However, other different types of equations may be obtained with different examples, which could be based on different models.

For example, the nonlinear dynamic model can be simplified by perturbation theory with a dynamics of the amplitude θ and the phase β to the input oscillator, $\theta(t)=\Theta(t_1)\cos(wt+\beta(t_1))$ with slow time $t_1$, $$\frac{d}{dt_1}\begin{bmatrix}\theta\\\beta\end{bmatrix} = A(\theta,\beta)\begin{bmatrix}\theta\\\beta\end{bmatrix} + B(\theta,\beta)u_\theta + Gw$$

where $u_\theta$ denotes the input from the control with input matrix function B and disturbance matrix function G. By the similar manner, the estimator can be derived with the output value.

By operating in a discrete environment (e.g., a processor-based one), the equations describing the dynamics of the mirror 122 may become (FIG. 10*c*):

$$x[i+1] = f(x[i],u[i],w[i])$$

$$y[i] = h(x[i],u[i],v[i])$$

where i are discrete time instants (e.g., sampling times of the sensor module 150).

In order to generate the pulse trigger control signal 132 for preparing the actual scheduling for the generation of the light pulse 112 for the time instant i+1, it would be preferable to have an extremely precise knowledge on the position of the mirror 122 (in order to trigger the light pulses 112 exactly at the intended positions). Unfortunately, this knowledge is in general not easily attainable, at least by virtue of the vibrations w, which render the state x of the mirror 122 in general non-observable.

Figure 4A:
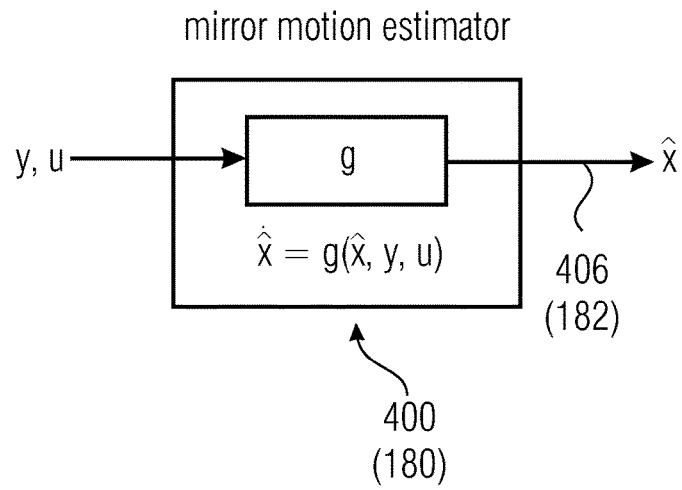
FIGS. 4a to 4c show elements and/or models of a scanning control system that may be implemented for the examples of FIGS. 1-3.
Figure 4B:
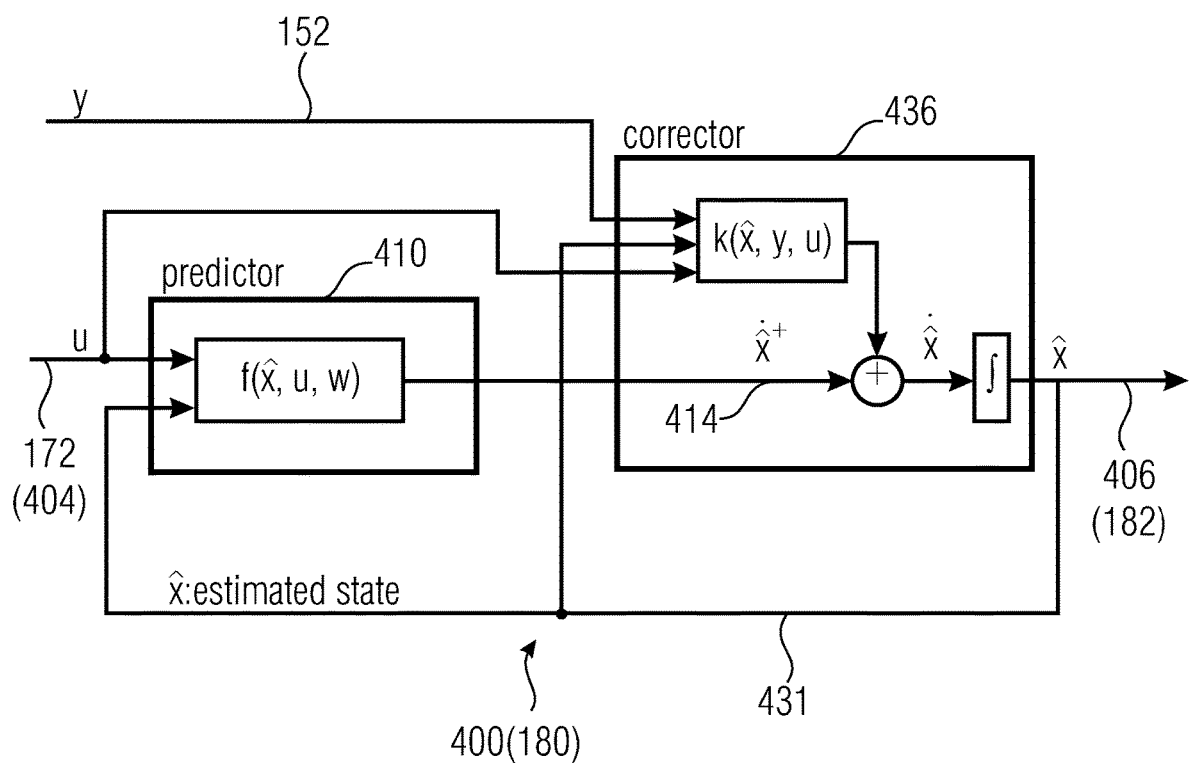
Figure 4C:
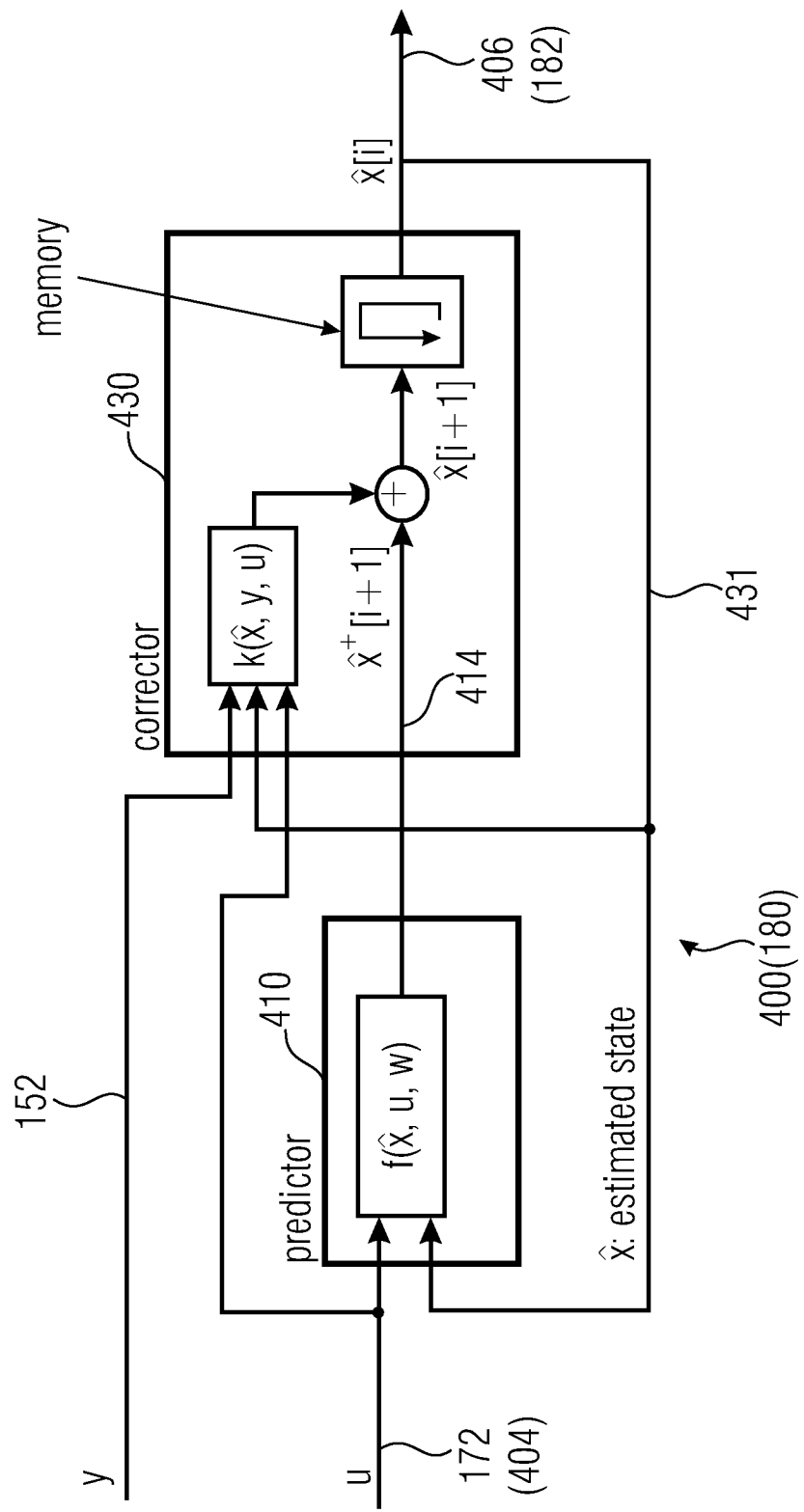

However, it has been understood that it is possible to obtain an estimation 182 of the position of the mirror 122 based on the best knowledge on the input u and on the output y (reference may be made to FIGS. 4*a* to 4*c*). For example, it has been understood that it is possible to make use of an estimated state and an estimation error (e=y−h($\hat{x}$)) and of the input u. At the motion estimator 180, the estimation of the position may be obtained on the basis of an estimation relationship (or observer relationship), such as:

$$\dot{\hat{x}} = g(\hat{x}, y, u).$$

In a discrete environment, the equation becomes:

$$\hat{x}[i+1] = g(\hat{x}[i], y[i], u[i]).$$

Here, at sampling instant i+1, an estimated mirror state $\hat{x}[i+1]$ (estimated motion information 182) may be obtained on the basis of the previous estimated mirror state $\hat{x}[i]$ (e.g., previously estimated motion information), the input u[i] (e.g., period of the previous motion mirror control signal 172), and the input y[i] (e.g., previously obtained measurement 152). The estimation equation may become:

$$g(\hat{x}, y, u) = f(\hat{x}, u) + k(\hat{x}, y),$$

or, in a discrete environment, $$g(\hat{x}[i], y[i], u[i]) = f(\hat{x}[i], u[i]) + k(\hat{x}, y)$$

where f and h are the functions which describe the dynamics of the mirror (see above), k is an application-specific function which associates the error. $f(\hat{x}, u)$ may be understood as representing a prediction of the state (position) of the mirror 122 based on the known dynamics of the mirror 122, and $k(\hat{x}, y)$ as representing a correction of the previous estimation $\hat{x}$. The value of $f(\hat{x}, u)$ can be easily obtained, despite the above-discussed difficulties in solving the equation $\dot{x} = f(x, u, w)$. It is to be noted that $f(\hat{x}, u)$ does not include the unknown disturbance w, but is associated to the correction $k(y - h(\hat{x}))$. Even the correction $k(y - h(\hat{x}))$ is easy to be processed (and in particular is much easier than y=h(x, u, v)).

The motion estimator 180 may perform trajectory analysis, e.g. to analyze the moment on the basis of multiple, subsequent feedback measurements 152.

The motion estimator 180 may include a filter, e.g., a low pass filter, which may be a digital filter.

Figure 6:
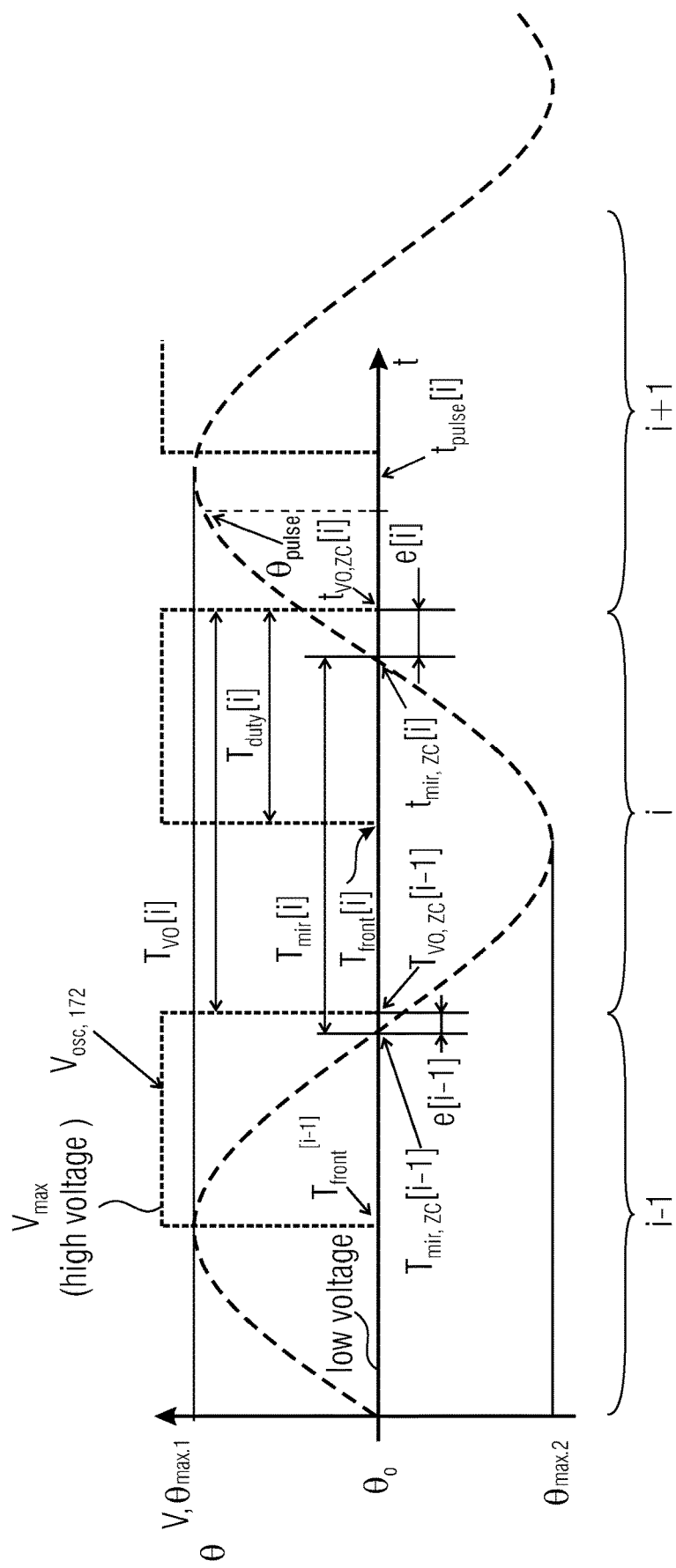
FIG. 6 shows a temporal evolution of signals in an example.

An example is provided in FIG. 6, which shows the evolution in time of the mirror position θ (between $\theta_{MAX,1}$ and $\theta_{MAX,2}$), as well as the evolution of the motion mirror control signal 172 provided by the oscillator 170 to the mirror driver 121 (which may be shown as a voltage $V_{osc}$ or a logical value, which may be "high logical value" or "low logical value"). Here, a sequence of discrete sampling times i−1, i, i+1 is shown. For simplicity, this example ignores the variation of amplitude. In examples, such additional motion information (such as the variation in amplitude) may be used to describe the dynamics more completely.

The motion mirror control signal 172 may have a period $T_{VO}[i]$, e.g., adjustable on the basis of the control loop 127.

The mirror position θ is part of the state x of the mirror 122, but is not directly observed. A magnitude which is in general observable is the capacitance C(θ) of the mirror driver 121, or the electric current at the mirror driver 121. In examples, by measuring the capacitance or the electric current, the time instants in which the angle passes through the zero-crossing position $\theta_0$ may be observed ($\theta_0$ may be the position at which no electric current flows in the capacitance). In examples, also the positive or negative sign of the electric current may be observed. What is observed by the sensor module 150 as feedback motion measurements 152 may be a sequence of time instants $t_{mir,zc}[i-1]$, $t_{mir,zc}[i]$, $t_{mir,zc}[i+1]$, etc., at which the zero-crossing position is reached by the mirror 122. The semi-period of the oscillations of the mirror 122 is here indicated with $T_{mir}[i]$, and may be understood as the difference between two consecutive zero crossing events, i.e. $T_{mir}[i] = t_{mir,zc}[i] - t_{mir,zc}[i-1]$.

It is now intended to schedule a particular sequence of pulses, to cover the intended scan lines in the field of view 522, a priori defined by the scheduling 143. Reference is here made to only one single pulse 112 for simplicity (of course, a plurality of pulses are in general to be generated for each period of the oscillation of the mirror 122, but the process is the same for each pulse). For the pulse 112, a desired scheduling 143 has been chosen a priori, and the pulse 112 has already been associated to a set mirror position $\theta_{pulse}$. The set mirror position $\theta_{pulse}$ could also be, a priori, associated to a time $t_{pulse}[i+1]$. Notwithstanding, it is intended to avoid that, by virtue of vibrations or other disturbances, $t_{pulse}[i+1]$ results associated to an incorrect angle.

It has been understood that it is possible to rely on the techniques above for obtaining a more precise pulse scheduling 142, in particular by adapting the pulse trigger control signal 132 to the oscillations of the mirror 122.

The dynamic model of the oscillations of the mirror theoretically foresees that, at an instant t[i−1] of FIG. 6, when oscillator 170 commands a high voltage status to the mirror driver 121, the electric current at the mirror driver 121 starts decreasing, e.g., changing the direction of the motion of the mirror. Basically, at instant t[i−1], the maximum angle $\theta_{max,1}$ is reached, and the mirror 122 shall move towards the maximum angle $\theta_{max,2}$. The zero-crossing position $\theta_0$ (where the electric current may be 0) is achieved at the mirror zero-crossing time instant $t_{mir,zc}[i-1]$ (which should theoretically coincide with instant $t_{vo,zc}[i-1]$), at which the motion mirror control signal 172 has a descending front.

However, as can be seen from FIG. 6, $t_{mir,zc}[i-1]$ is not the same of $t_{vo,zc}[i-1]$, e.g., because of vibrations. Accordingly, an error $e[i-1] = t_{mir,zc}[i-1] - t_{vo,zc}[i-1]$ is caused. The same applies to the sampling time i: an error $e[i] = t_{mir,zc}[i] - t_{vo,zc}[i]$ is caused by the fact that the zero-crossing instant $t_{mir,zc}[i]$ of the mirror is not the same of the zero-crossing instant $t_{vo,zc}[i]$ of the motion mirror control signal 172 from the oscillator 170.

Therefore, the following assumptions may be stated.

At the sampling time i+1, the state x[i+1] of the mirror 122 may be understood as being estimated as $\hat{x}[i+1]$, which includes:

a mirror period $\hat{T}_{mir}[i]$; and a zero-crossing time instant $\hat{t}_{mir,zc}[i]$ of the mirror which is understood as being an estimation of the position θ of the mirror 122.

Assume that the dynamics of the mirror f can be generated by these two mirror motion information. With reference to FIG. 4b, it is possible to obtain $$\hat{x}^+[i+1] = \begin{bmatrix} \hat{T}_{mir}^+[i+1] \\ \hat{t}_{mir,zc}^+[i+1] \end{bmatrix} = f(\hat{x}[i], u[i]),$$

where u is the behaviour of oscillator, $t_{vo,zc}$, $T_{VO}$, and the applied high voltage $V_{osc}$.

This intermediate estimated state ($\hat{x}^+[i+1]$ or 414) may be corrected by taking into account the observed errors measurements in the previous sampling time i. In particular, the timing error between mirror and the oscillator e[i] is now recognized as actually being subjected to an error e[i]−e[i−1], where $e[i-1] = t_{vo,zc}[i-1] - t_{vo,zc}[i-1]$, and $e[i] = t_{mir,zc}[i] - t_{vo,zc}[i]$.

This brings to the consideration that the predicted state of the mirror 122 is to be corrected by the error e[i]−e[i−1]. Hence, for sampling instant i+1, the estimated motion information may be corrected by deleting (compensating) the error e. The resulting estimated motion information 182 may be of the type:

$$T_{mir,meas}[i]=T_{vo}[i]-(e[i]-e[i-1])+v_1.$$

$$t_{mir,zc,meas}[i]=e[i]+t_{vo,zc}[i]+v_2.$$

The $T_{mir,meas}[i]$ and $t_{mir,zc,meas}[i]$ can be regarded as the measurement of the mirror information y. $v_1$ and $v_2$ are measurement noise for each measurement. Consider that identity output $h(\hat{x}[i], 0)=\hat{x}[i]$, a simple estimator can be defined as $$\hat{T}_{mir}[i+1]=\hat{T}_{mir}^+[i+1]+k_1(T_{mir,meas}[i]-\hat{T}_{mir}[i]),$$

$$\hat{t}_{mir,zc}[i+1]=\hat{t}_{mir,zc}^+[i+1]+k_2(t_{mir,zc,meas}[i]-\hat{t}_{mir,zc}[i]),$$

where $k_1$ and $k_2$ are constant gains that scales between measurements and the model for the next state, which allow reducing noise and disturbance in the estimated value. This estimator equation shows that the measurement of the mirror period and the zero crossing may be compared with the estimated dynamics to extract most probable mirror motion estimation.

In this example, the measured time and period is basically the inverse of the measurement. This may cause problems of noise so that the estimator typically uses the measurement. Therefore, in more general case, the output y is directly set to the measurement of the mirror zero crossing time $t_{vo,zc}$ and the error from the oscillator e, y=

$$\hat{T}_{mir}[i+1]=\hat{T}_{mir}^+[i+1]+k_{g1}(\hat{T}_{mir},\hat{t}_{mir,zc},e,\hat{t}_{vo,zc}),$$

$$\hat{t}_{mir,zc}[i+1]=\hat{t}_{mir,zc}^+[i+1]+k_{g2}(\hat{T}_{mir},\hat{t}_{mir,zc},e,\hat{t}_{vo,zc}),$$

$k_{g1}$ and $k_{g2}$ are general functions that compensate each mirror period and the timing of zero crossing from the measurement, respectively.

Notably, by virtue of the frequency being the inverse of the period, the estimated motion information 182 may include the notion of the frequency of the oscillation being $$f_{mir}[i] = \frac{1}{T_{mir}[i]} = \frac{1}{T_{vo}[i]-(e[i]-e[i-1])}.$$

Accordingly, the frequency rate of the pulse trigger control signal 132 may be adaptively adjusted to the oscillation of the mirror 122.

Further, we may correct the zero-time instant (previously estimated as $t_{vo,zc}[i]$) to be $t_{mir,zc}[i]$. Hence, the phase of the pulse trigger control signal 132 may also be adaptively adjusted to the oscillation of the mirror 122.

The process above may be based on a Kalman filter, for example.

An example of the motion estimator 180 may be the estimator 400 of FIGS. 4b and 4c (respectively regarding a continuous case and a discrete case). The estimator 400 may comprise a predictor 410 and/or a corrector 430. The predictor 410 may predict motion information 414 (e.g., a first estimate of the state, such as positions and/or velocity, of the mirror 122, based on the model of the dynamics of the oscillation). The corrector 430 may correct the predicted motion information (e.g., a second, more precise, estimate of the state of the mirror 122), based on a comparison between a previous estimate 431 and the output y. The corrected motion information may provide corrected motion information 406 as the estimated motion information 182.

As may be seen from FIG. 4c, for the sampling time i+1 the predictor 410 may predict the oscillation state (e.g., position, velocity, acceleration, etc.) of the mirror 122 on the basis of a dynamic model (expressed by f), which predicts the state ($\hat{x}$(i+1)) of the mirror 122. The predictor 410 may be input, at 404, by the motion mirror control signal 172 (u(i)). The predictor 410 may output a predicted motion information 414 (f($\hat{x}$(i), u(i))). In order to obtain the predicted motion information 414 (f($\hat{x}$(i), u(i))), the predictor 410 may make use of the previously predicted state ($\hat{x}$(i)), indicated with 431 in FIGS. 4b and 4c. The predictor 410 may, therefore, obtain the predicted motion information 414 (f($\hat{x}$(i), u(i))) by applying a dynamic model (f) to the previously estimated state ($\hat{x}$(i)) and the motion mirror control signal 172 (u(i)). It is to be noted that the model (f) is the model which, in general, describes physical interactions between the evolution (modification) ($\dot{x}$) of the state (motion information) and the reference information (u) (motion mirror control signal 172) provided to the mirror driver 121 ($\dot{x}$=f(x, u, w)).

It is now possible to see, with reference to FIG. 6, how the scheduling is obtained by the pulse scheduler 140 for sampling time i+1 on the basis of the estimated motion information 182 provided by the motion estimator 180 (e.g., 400). This goal is achieved by having the knowledge of:

the start of the sampling time i+1, which is at time instant $t_{mir,zc}[i]$ (estimation of the position of the zero angle $\theta_0$);

the time length of the period $T_{mir}[i+1]$ (estimation associated to the frequency of the oscillation).

On the basis of this information, it is possible to associate an angle $\theta_{pulse}[i+1]$ (according to the desired scheduling 143) to a trigger time $t_{pulse}[i+1]$.

An example is provided by the following equation:

$$t_{pulse}[i+1]=t_{mir,zc}[i]+\alpha T_{mir}[i],$$

where α is obtained from the desired scheduling 143 and is associated to a delay of the trigger instant $t_{pulse}[i+1]$ with respect to the instant $t_{mir,zc}[i]$ in which the zero position of the mirror 122 is (according to the estimation 182) at the zero position $\theta_0$.

Figure 9C:
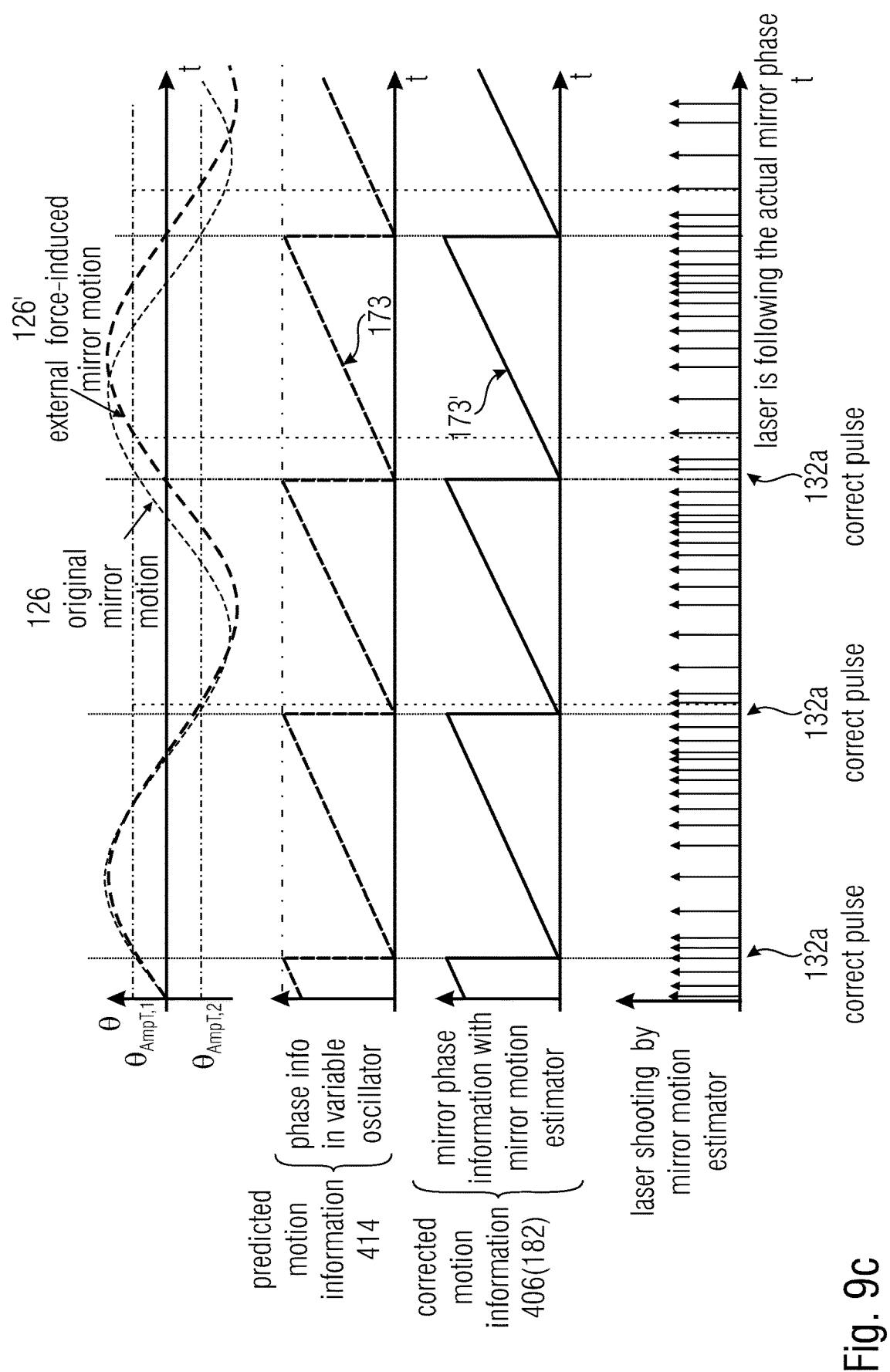

Another example may be discussed with reference to FIG. 9c, with the present examples it is possible to consider the value 173 as counted by the timer of the oscillator 170 as the predicted motion information 414, wherein value 173' (mirror phase information with mirror motion estimation) is corrected to obtain the corrected motion information 406 (182).

Figure 11:
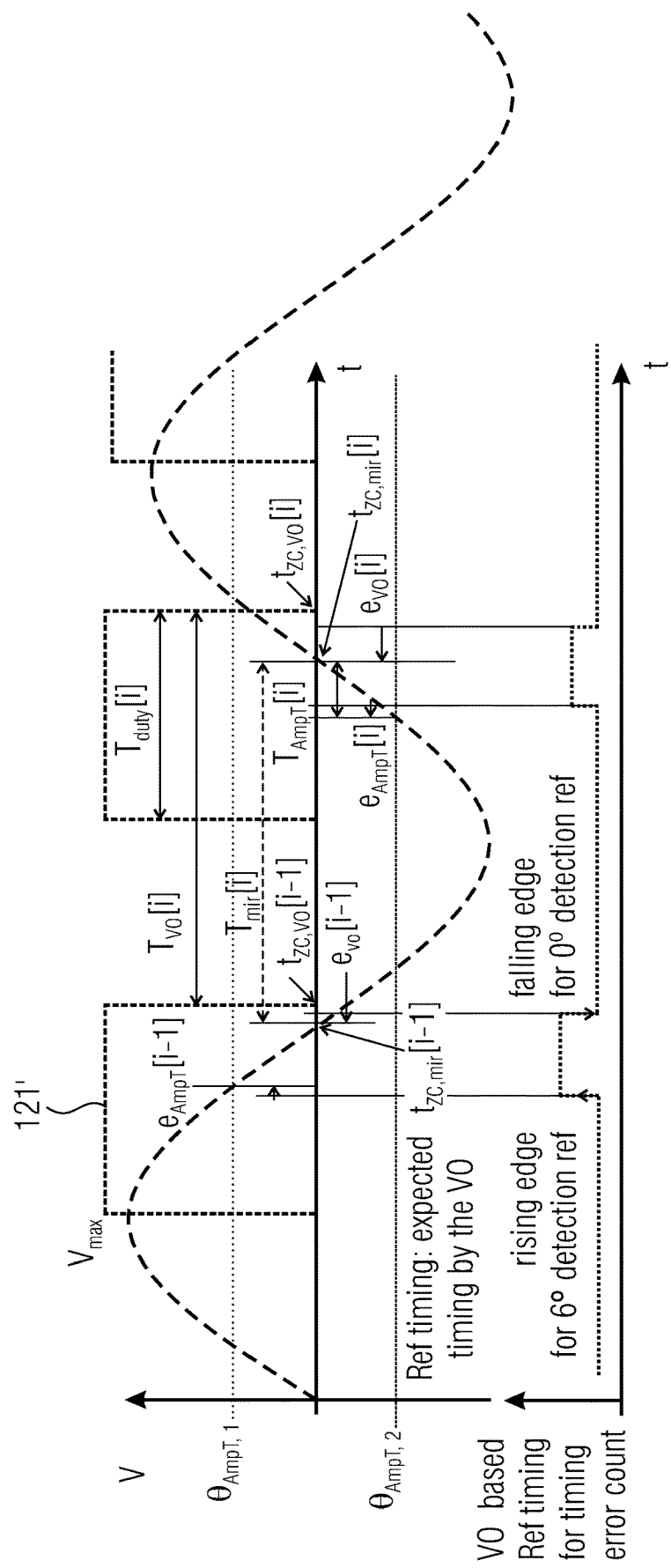
FIG. 11 shows a temporal evolution of signals in another example.

Reference is now made to FIG. 11 for another example considering information about mirror motion amplitude. From the counter of the oscillator 170 (with period $T_{vo}$), the mirror timing error can be obtained from the detection references. Here are 0° (e.g., zero crossing at $\theta_0$) and 6° (or another value for $\theta_{AmpT,1}$) are given as an example, even though other values may be taken into consideration. We still assume that, according to the desired scheduling 143, at the desired angle $\theta_{AmpT,1}$ a light pulse is to be generated (e.g., $\theta_{AmpT,1}$ is associated, through a particular angle α, to the maximum amplitude $\theta_{max}$). The semi period (half period) of the oscillation of the mirror 122 and the instant for firing the light pulse can be calculated by the measured value as:

$$T_{mir}[i]=T_{VO}[i]-(e_{VO}[i]-e_{VO}[i-1]),$$

$$T_{AmpT}[i]=\alpha T_{VO}[i]+e_{AmpT}[i]-e_{VO}[i].$$

$$t_{mir,zc,meas}[i]=e_{VO}[i]+t_{vo,zc}[i].$$

With reference to the models above, it is possible to state that:

$$y = \begin{bmatrix} e_{VO}[i] \\ e_{AmpT}[i] \\ t_{mir,zc,meas}[i] \end{bmatrix} = h(T_{mir}, T_{AmpT}, t_{mir,zc}, T_{vo}, T_{duty}, t_{vo,zc}, V_{max}, v).$$

Here, the mirror's state x may include at least one of $T_{mir}$, $T_{AmpT}$. The input u may include at least one of $T_{vo}$, $T_{duty}$, $t_{vo,zc}$, and $V_{max}$ (respectively the period, the duty cycle, the instant at which the motion mirror control signal 172 has a descending front, and the maximum voltage of the signal motion mirror control signal 172). The measurement noise is indicated with v.

Magnitudes like the mirror motion half period (T r) and the mirror amplitude timing ($T_{AmpT}$, duration from $\theta_{AmpT,1}$ to $\theta_0$ degree) may be states for describing mirror's motion, i.e.

$$x[i+1] = \begin{bmatrix} T_{mir}[i+1] \\ T_{AmpT}[i+1] \\ t_{mir,zc}[i+1] \end{bmatrix} = f(x[i], T_{vo}, T_{duty}, t_{vo,zc}, V_{max}, w)$$

As can be understood from FIG. 4c, the observer may be designed by the mirror dynamics by $$\hat{x}[i+1] = f(\hat{x}[i], T_{vo}, T_{duty}, t_{vo,zc}, V_{max}, 0) + k(y, \hat{x}[i], T_{vo}, T_{duty}, t_{vo,zc}, V_{max})$$

The mirror's motion can be obtained based on the estimated period and amplitude period.

Advantageously, a simple estimator without dynamic model may also be obtained. In this case, the mirror dynamics may be ignored, but directly calculate the mirror timing by:

$$\hat{T}_{mir}[i] = T_{VO}[i] - (e_{VO}[i] - e_{VO}[i-1]),$$

$$\hat{T}_{AmpT}[i] = \alpha T_{VO}[i] + e_{AmpT}[i] - e_{vo}[i],$$

$$\hat{t}_{mir,zc}[i] = e_{VO}[i] + t_{vo,zc}[i].$$

This is special case of the original estimation equation of $$\hat{x}[i+1] = f(\hat{x}[i], T_{vo}, T_{duty}, t_{vo,zc}, V_{max}, 0) + k(y, \hat{x}[i], T_{vo}, T_{duty}, t_{vo,zc}, V_{max}),$$

where $$f(\hat{x}[i], T_{vo}, T_{duty}, t_{vo,zc}, V_{max}, 0) = 0$$

and $$k(y, \hat{x}[i], T_{vo}, T_{duty}, t_{vo,zc}, V_{max}) = h^{-1}(y, u).$$

It is possible to apply a low pass filtering (e.g., averaging) to reduce noise.

Figure 2:
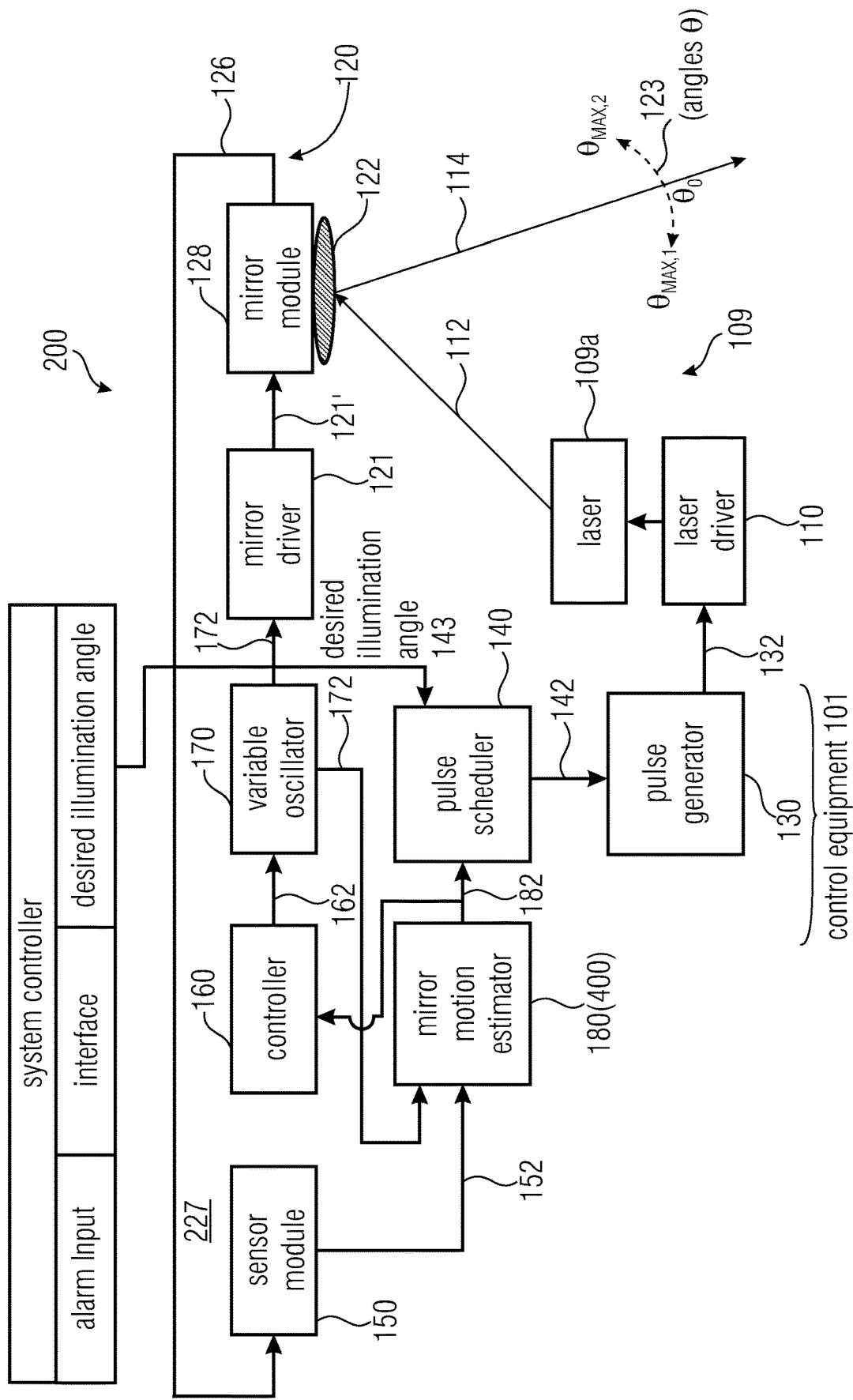

FIG. 2 shows a variant 200 of the laser scanning control system 100 of FIG. 1, where the same reference numerals are used where possible. As can be seen in FIG. 2, the estimated motion information 182 generated by the motion estimator 180 (e.g., 400) may be input to a controller 160. Basically, here the motion estimator 180 may be part of a feedback loop 227. The motion estimator 180 (e.g., 400) may operate as one of the examples above.

Basically, the motion estimator 180 may reconstruct the period (or frequency) and the phase of the oscillation of the mirror 122, and output them as the estimated motion information 182.

The estimated motion information 182, therefore, may be used as reconstructed information on the oscillation of the mirror 122.

The scheduling 142 of the pulse generation 132 may be controlled as in the example of FIG. 1 and is here not repeated. However, in alternative examples, a different scheduling may be performed: for example, the motion estimator 180 may be used only for the feedback loop 227 and is not used for generating the scheduling 142 (e.g., the output 182 from the motion estimator 180 could be only directed to the controller 160, while the input to the pulse scheduler 140 could be obtained uniquely from the oscillator 170).

Basically, the motion mirror control signal 172 may be generated by considering the estimated motion information 182.

Figure 3:
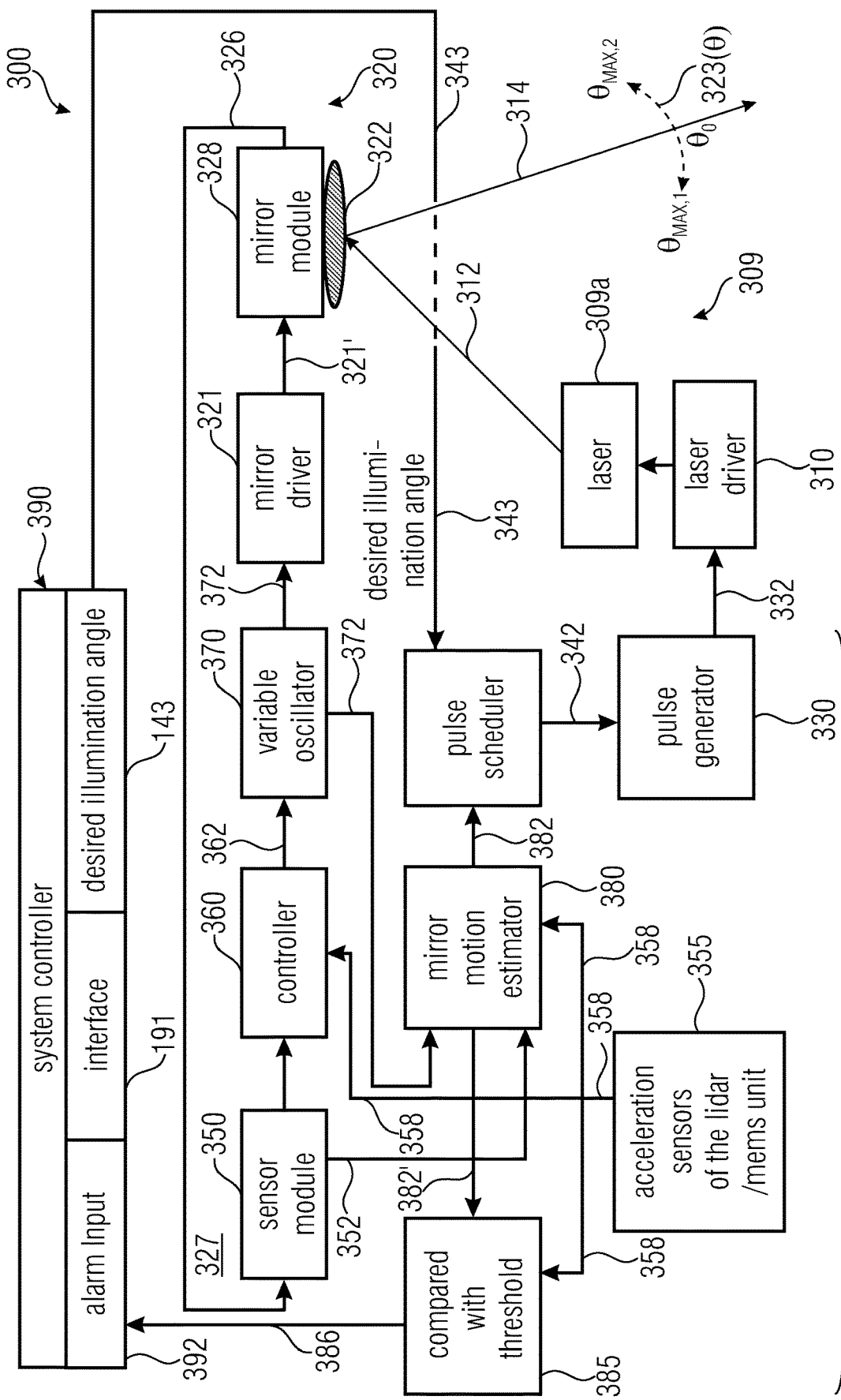

Another example of laser scanning control system 300 is represented in FIG. 3. The reference numerals of the elements of FIG. 1 are here repeated with the addition of 200, and they may operate in the same way, at least where not explicitly explained. Here, control equipment 301 may perform a coordinated scanning control by controlling:

a mirror driver 321 (e.g., like 121), to drive a mirror 322 (e.g., like 122) along desired mirror positions 323 (e.g. like 123) through a motion mirror control signal 372 (e.g. like 172); and/or a laser driver 310 (e.g. as 110), to cause the generation of laser light pulses 312 (e.g. like 312) to be impinged onto the mirror 322 at the desired mirror positions 123 through a pulse trigger control signal 332 (e.g. like 132).

The control equipment 301 may be configured to adaptively synchronize the motion mirror control signal 372 to feedback motion measurements 352 and/or 358 associated to the motion of the mirror 122. The control equipment 301 may include a motion estimator 380 to provide estimated motion information (here, 382) based on first feedback motion measurements 358, to cause the generation of the pulse trigger control signal 332 by adapting, to the estimated motion information 382, a desired scheduling 343 (e.g., like 143), for triggering the laser light pulses 312.

Here, a first sensor module 350 may provide first feedback motion measurements 352, as a feedback. Here, the first sensor module 350 may provide measurement(s) associated to the position and/or motion and/or acceleration: e.g., the measurement(s) 352 may be embodied by angles θ[i], or by zero-cross information associated to the angles (in this case, the measurements 352 may be embodied by time information $t_{mir,zc}$ [i]), or some other information associated to particular events (e.g., the position θ being at a particular value different from the zero value).

The first feedback motion measurement(s) 352 may be provided to a controller 360, which may at least partially play the role of the controller 160. In particular, the controller 360 may close a PLL control loop 327. The oscillator 370 (e.g., like 170) may generate the motion mirror control signal 372 under the control 362 of the controller 360. The mirror driver 321 (e.g., like 121) may include a structure (e.g., capacitive motor 238), e.g. with interdigitated fingers (see above), even though other techniques may be possible. The mirror 322 may be controlled as the mirror 122 (see above) by a voltage 321' synchronized with the motion mirror control signal 372. A PLL loop 327 is accordingly generated.

In addition, a second sensor 355, such as an acceleration sensor (e.g., gyro sensor) may be provided. The second sensor 355 may be a vibration sensor. In some examples, multiple (e.g., three) gyro sensors are used for different axes. The second sensor 355 may be, in alternative examples, different from an acceleration sensor. In general, the first sensor 350 and the second sensor 355 may be different and based on different physical principles (e.g., measuring different physical magnitudes). The second sensor 355 may provide second feedback motion measurements 358. The second feedback motion measurements 358 may be associated to the position and/or velocity and/or acceleration of the mirror 322, but may be configured to provide information on a physical magnitude different from that measured by the first sensor 352.

The motion estimator 380 may obtain an estimated motion information 382 from the first feedback motion measurement(s) 355 (e.g., positions, angles, vibrations . . . ) and/or from the first feedback motion measurement(s) 352.

At least for verifying the reliability, estimated motion information 382' may permit to compare the first feedback motion measurement(s) 352 and/or the first second feedback motion measurement(s) 355 with a threshold at a comparer 385. For example, the information may be based on both the first measurement(s) 352 and the second measurement(s) 355. Obtained motion information 382' may be compared with each other and/or with a threshold at the comparer 385. At least one of the first and second information may be processed so as to become compliant to each other. For example, if the first measurement(s) are velocity measurement(s) and the second measurement(s) are acceleration measurement(s), the second measurement(s) may be integrated, so as to be converted into a velocity. After that, the information on velocity and the information on the acceleration integrated into velocity may be compared with each other and, if the difference between the first and the second is over a confidence threshold, the estimated motion information may be considered valid; otherwise, an alarm 386 may be provided to the alarm interface 392 of the system controller 390.

In the example of FIG. 3, the controller 360 may be at least partially fed by the second feedback measurement(s) 358, in addition or alternative to the provision of the first feedback measurement(s) 352 from the sensor module 350. Accordingly, the sensor 355 may be part of the PLL loop 327. In other examples, the controller 360 may be at least partially fed by the estimated motion information 382 provided by the mirror motion estimator 380, as in the example of FIG. 2. Accordingly, the mirror motion estimator 380 may be part of the PLL loop 327.

In the example of FIG. 3 there the controller is not fed with the estimated motion information 382. Therefore, in that case, there is no influence of the estimated motion information 382 onto the control loop 327. However, in addition or alternative, the estimated motion information 382 may be provided to the controller 360 (as in FIG. 2), to participate to the control loop 327.

In examples above, reference is often made to concepts like "information" and "measurements". The "information" and "measurements" may of course be associated to signals and, therefore, be characterized by phase, amplitude, frequency, etc. and may be subjected to typical processing which may be performed on digital and/or analog signals. The same applies to "signals", which may be understood as "information".

Further, the feedback measurements 152, 352, 358 may be based on several sensing principles (e.g. (current sensing (zero crossings, peak detection, trajectory analysis), position detection (PSD), optical encoding, piezoresistive sensing, etc.). If multiple motion estimators are used, it may be preferable that they are input from measurements obtained from different principles, to increase reliability.

In examples, the frequency of the oscillations of the mirror (122, 322) may be between 1 KHz and 10 Khz. The light pulses 112, 312 may be triggered at frequency of 50 KHz-800 KHz.

In examples above and/or below, the motion estimator 180 (e.g., 400) mail lack a separated oscillator or a phase calculation unit, but may be configured to recalculate the actual mirror phase based on the difference in mirror period and phase error from the variable oscillator.

The example of FIG. 3 may also be generalized. The laser scanning control system 300 may in general check the feedback measurement(s) 352 and/or 358 without any estimator. In that case, the feedback measurements may be associated to the motion of the mirror 322 and to the motion of other components, such as the LiDAR/MEMS unit. A comparer 385 may therefore analyze a distance between the feedback motion measurement(s) (e.g., acceleration measurement(s)) and a confidence threshold, so as to cause the start of an alarm procedure (386) in case of distance being over the confidence threshold. In the simplest case, there is not the necessity of having two different sensors.

Figure 7:
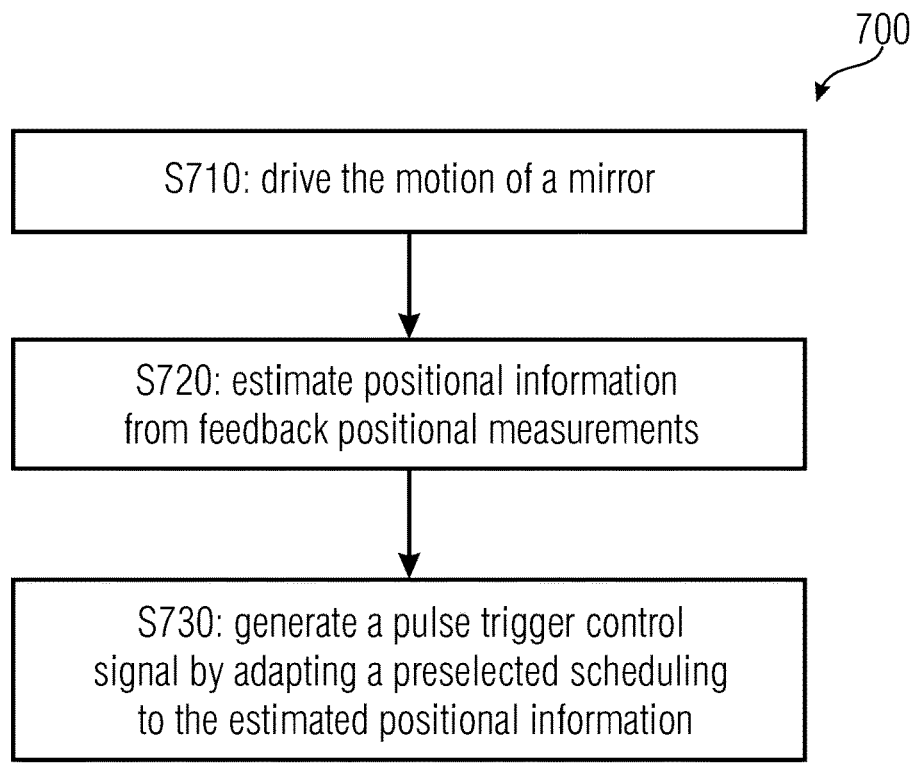
FIGS. 7 and 8 show examples of methods.

FIG. 7 shows a method 700. The method 700 may be used in combination with the equipment above. The method 700 may comprise at least one of the following steps:

S710: driving the motion of a mirror (e.g. 122, 322) according to an oscillatory movement;

S720: estimating motion information (e.g. 182, 382, 406) from feedback motion measurements (e.g. 152, 352, 358); and S730: generating a pulse trigger control signal (e.g. 132) by adapting a desired scheduling (e.g. 143) to the estimated motion information (e.g. 182, 382, 406).

Figure 8:
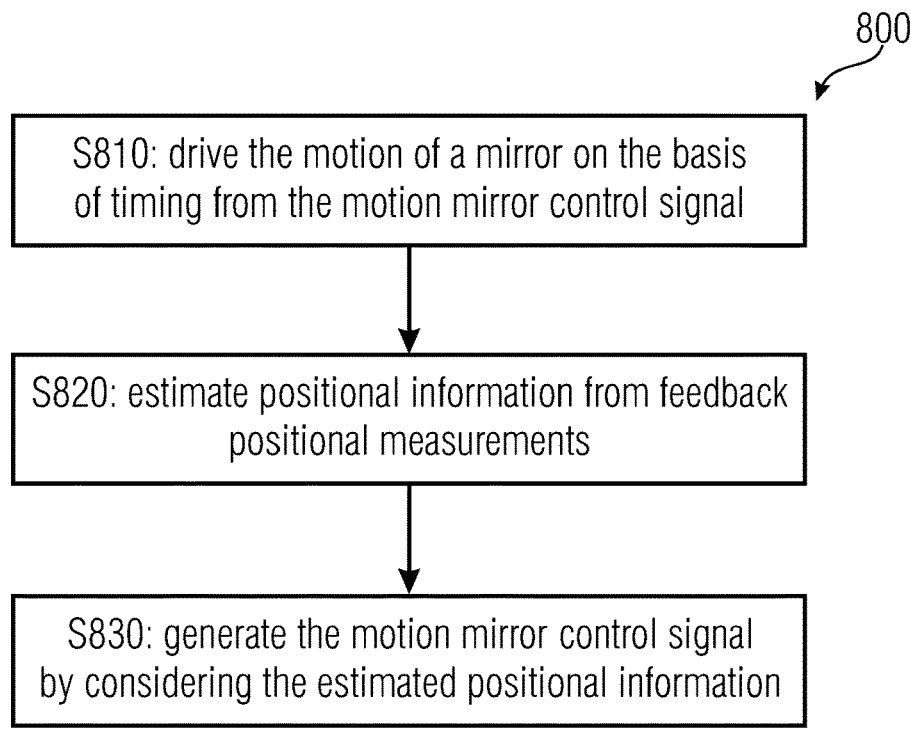

FIG. 8 shows a method 800. The method 800 may be used in combination with the equipment above. The method 800 may comprise at least one of the following steps:

S810: driving the motion of a mirror (e.g. 122, 322) according to an oscillatory movement;

S820: estimating motion information (e.g. 182, 382, 406) from feedback motion measurements (e.g. 152, 352, 358); and S830: generating the motion mirror control signal (e.g. 372) by considering the estimated motion information (e.g. 382, 406).

There is also disclosed a non-transitory storage unit comprising storing instructions which, when executed by a processor, cause the processor to perform one of the methods above.

Summarizing, at least one of the following aspects may be found in examples:

The laser generation may be synchronized to the motion estimator (180, 380, 400).

The motion estimator (180, 380, 400) may be separated from the oscillator (170, 370), which determines the mirror behaviour based on the measurement.

The mirror motion estimator may have an additional oscillator that synchronized mirror motion and/or keeps the phase and amplitude and other mirror states in order to compensate the mirror actuation oscillator errors with respect to the mirror motion.

In respect of above, it is noted that mirror motion estimator 180 (e.g., functions f, k, etc.) may be application-specific and may vary with different systems. In some cases, the functions f and k may be obtained by calibration, for example.

With reference to FIG. 5, examples above may be used, for example in a light detection and ranging (LIDAR) system 500. LIDAR is a remote sensing technique that uses light in the form of a pulsed laser (e.g., 112, 114, 312, 314) to measure ranges (variable distances) to one or more objects in a field of view (e.g., 522). In particular, the mirror 122 or 322 (e.g., a MEMS mirror) may be used to scan light across the field of view 522. A reception unit 514 may be used to receive a response light beam. A processor (not shown) may be used to perform a ranging on the basis of the response light beam. Arrays of photodetectors 515 receive reflections from objects illuminated by the light (114, 314) irradiated by the photodiodes 109a of the illumination unit 109, and the time necessary for the reflections to arrive at various sensors in the photodetector array 515 is determined. This is also referred to as measuring time-of-flight (TOF). The LIDAR system 500 forms depth measurements and makes distance measurements by mapping the distance to objects based on the time-of-flight computations. Thus, the time-of-flight computations can create distance and depth maps, which may be used to generate images. (The operations discuss above for generating the light pulses 112 and for reflecting them towards scanning areas of the field of view 522 are here not repeated.) The photodetector array 515 can be any of a number of photodetector types; including avalanche photodiodes (APD), photocells, and/or other photodiode devices. Imaging sensors such as charge-coupled devices (CCDs) can be the photodetectors. In the examples provided herein, the photodetector array 515 is a two-dimensional (2D) APD array that comprises an array of APD pixels. In other embodiments, the photodetector array 515 may be a 1D array that includes a single column of photodiodes. The activation of the photodiodes 515 may be synchronized with light pulses emitted by the illumination unit 109. In examples, for each distance sampling, a microcontroller triggers a laser pulse from each of the light sources 109a of the illumination unit 509 and also starts a timer in a Time-to-Digital Converter (TDC) Integrated Circuit (IC). The laser pulse (112, 114, 312, 314) is propagated through the transmission optics, reflected by the target field, and captured by an APD of the APD array 515. The APD array 515 may emit a short electrical pulse which may then be amplified by an electrical signal amplifier. A comparator IC may recognize the pulse and send a digital signal to the TDC to stop the timer. The TDC uses a clock frequency to calibrate each measurement. The TDC may send the serial data of the differential time between the start and stop digital signals to the microcontroller, which filters out any error reads, averages multiple time measurements, and calculates the distance to the target at that particular field position. By emitting successive light pulses in different directions (scanning directions) established by the mirror (122, 322, an area can be scanned, a three-dimensional image can be generated, and objects within the area can be detected.

It has been noted that the LIDAR system including the present laser scanning control system may be implemented in a car, e.g., for ranging different vehicles (e.g., for safety applications).

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine-readable carrier.

Other embodiments comprise the computer program for performing one of the methods described herein, stored on a machine-readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A laser scanning control system, comprising:
   control equipment configured to perform a coordinated scanning control by controlling a mirror driver and a laser driver;
   the mirror driver configured to generate a motion mirror control signal to drive a mirror along desired mirror positions; and
   the laser driver configured generate a pulse trigger control signal to cause a generation of laser light pulses to be impinged onto the mirror at the desired mirror positions,
   wherein the control equipment includes a motion estimator configured to provide estimated motion information based on at least one feedback motion measurement associated with a motion of the mirror, and
   wherein the control equipment is configured to generate the pulse trigger control signal by adapting, to the estimated motion information, a desired scheduling for triggering the laser light pulses.

2. The laser scanning control system of claim 1, wherein:
   the control equipment adapts a phase-locked loop based on the at least one feedback motion measurement,
   the control equipment is configured to generate the motion mirror control signal based on the estimated motion information.

3. The laser scanning control system according to claim 1, wherein:
   the control equipment is configured to generate the motion mirror control signal based on the estimated motion information,
   wherein the motion estimator includes:
     a predictor configured to predict motion information associated with the motion of the mirror; and
     a corrector configured to correct the predicted motion information in order to provide corrected motion information as the estimated motion information.

4. The laser scanning control system of claim 3, wherein:
   the predictor is configured to adapt at least one of a period or a frequency of the pulse trigger control signal to a period or a frequency of the estimated motion information, respectively, and
   the corrector is configured to adapt a phase of the pulse trigger control signal to a phase of the estimated motion information.

5. The laser scanning control system of claim 3, wherein the predictor is configured to obtain the predicted motion information on a basis of:
   a previously estimated motion information and at least a first model,
   the first model describing physical interactions associating at least an evolution of the estimated motion information with information associated with the motion mirror control signal.

6. The laser scanning control system of claim 5, wherein the corrector is configured to correct the predicted motion information obtained from the predictor to obtain the corrected motion information on the basis of at least a second model,
   the second model describing physical interactions associating at least the estimated motion information with the at least one feedback motion measurement provided to the mirror driver.

7. The laser scanning control system of claim 3, wherein the corrector is configured to compensate, in the estimated motion information, error information detected by comparing previously estimated motion information with the at least one feedback motion measurement.

8. The laser scanning control system of claim 3, wherein the predictor is configured to predict the motion information on a basis of at least one of a period of the motion mirror control signal, phase information of the motion mirror control signal, or frequency information of the motion mirror control signal, and
   the corrector is configured to correct the estimated motion information on a basis of at least one of a period, a frequency, or a phase of the motion mirror control signal controlling the mirror driver with the at least one feedback motion measurement.

9. The laser scanning control system of claim 3, wherein the motion estimator is configured as a Kalman filter configured to estimate a state associated with the predicted motion information.

10. The laser scanning control system of claim 3, wherein the predicted motion information includes at least one of position, velocity, acceleration, amplitude, and phase to an input of the motion of the mirror.

11. The laser scanning control system of claim 3, wherein the at least one feedback motion measurement includes at least one angle measurement associated with an angle of the mirror.

12. The laser scanning control system of claim 3, wherein the motion estimator is configured to estimate a position of the mirror.

13. The laser scanning control system of claim 3, wherein the motion estimator is configured to estimate at least one of a velocity and an acceleration of a movement of the mirror.

14. The laser scanning control system of claim 3, wherein the at least one feedback motion measurement includes at least one measurement of a voltage, an electric current, or a capacitance.

15. The laser scanning control system of claim 3, wherein the at least one feedback motion measurement includes at least one zero-crossing measurement or indication of time instants at which at least one particular condition occurs.

16. The laser scanning control system of claim 3, wherein the at least one feedback motion measurement includes a vibration measurement or a measurement associated with a vibration of the mirror.

17. The laser scanning control system of any of claim 3, wherein the mirror driver is configured to control the motion of the mirror based on the motion mirror control signal which provides a timing for the mirror driver,
   wherein the estimator is configured to obtain the estimated motion information by analyzing the motion mirror control signal and the at least one feedback motion measurement.

18. The laser scanning control system of claim 3, wherein the motion estimator is configured to obtain a first feedback motion measurement and a second feedback motion measurement different from the first feedback motion measurement to control a pulse generator on a basis of the first feedback motion measurement and the second feedback motion measurement.

19. The laser scanning control system of claim 3, wherein the motion estimator is configured to estimate motion information from a first feedback motion measurement and a second feedback motion measurement different from the first feedback motion measurement,
wherein the laser scanning control system further comprises a comparer configured to analyze a distance between the first and the second feedback motion measurements, and trigger an alarm procedure in case of the distance exceeds a confidence threshold.

20. A laser scanning control system, comprising:
control equipment including a motion estimator configured to provide estimated motion information based on at least one feedback motion measurement, wherein the control equipment is configured to generate a motion mirror control signal based on the estimated motion information,
wherein the motion estimator comprises:
a predictor configured to predict motion information associated with a motion of an oscillating mirror; and
a corrector configured to correct the predicted motion information in order to provide corrected motion information as the estimated motion information.

21. A laser scanning control system, comprising:
control equipment configured control a mirror driver and laser driver to perform a coordinated scanning control;
the mirror driver configured to generate a motion mirror control signal to drive a mirror along desired mirror positions;
the laser driver configured generate a pulse trigger control signal to cause a generation of laser light pulses to be impinged onto the mirror at the desired mirror positions;
at least one sensor module configured to provide feedback motion measurements associated with a motion of the mirror; and
a comparer configured to analyze a distance between the feedback motion measurements and a confidence threshold, and trigger an alarm procedure in case of the distance exceeds the confidence threshold.

22. The laser scanning control system of claim 21, wherein at least one of the feedback motion measurements includes an acceleration measurement.

23. The laser scanning control system of claim 21, wherein the at least one sensor module is an optical sensor and provides the feedback motion measurements from optical detections.

24. A light detection and ranging (LIDAR) system, comprising:
a laser scanning control system; and
a receiving unit configured to perform a ranging on a basis of an obtained light beam,
wherein the laser scanning control system comprises:
control equipment configured to perform a coordinated scanning control by controlling a mirror driver and a laser driver;
the mirror driver configured to generate a motion mirror control signal to drive a mirror along desired mirror positions; and
the laser driver configured generate a pulse trigger control signal to cause a generation of laser light pulses to be impinged onto the mirror at the desired mirror positions,
wherein the control equipment includes a motion estimator configured to provide estimated motion information based on at least one feedback motion measurement associated with a motion of the mirror, and
wherein the control equipment is configured to generate the pulse trigger control signal by adapting, to the estimated motion information, a desired scheduling for triggering the laser light pulses.

25. A method, comprising:
driving a motion of a mirror according to an oscillatory movement;
estimating motion information from feedback motion measurements of the mirror;
generating a pulse trigger control signal by adapting a desired scheduling of laser light pulses to the estimated motion information to cause the generation of the laser light pulses to be impinged onto the mirror at desired mirror positions according to the adapted desired scheduling; and
generating a motion mirror control signal based on the estimated motion information to drive the mirror along the desired mirror positions.

26. A non-transitory computer readable storage medium comprising storing instructions which, when executed by a processor, cause the processor to perform the method of claim 25.

27. A method for controlling laser scanning, the method comprising:
driving a motion of a mirror according to an oscillatory movement;
obtaining feedback motion measurements associated with the motion of the mirror;
calculating a distance between the feedback motion measurements;
comparing the distance to a confidence threshold; and
triggering an alarm procedure in case of the distance exceeds the confidence threshold.

28. A non-transitory computer readable storage medium comprising storing instructions which, when executed by a processor, cause the processor to perform the method of claim 27.

* * * * *